(12) United States Patent
Gestrelius et al.

(10) Patent No.: US 10,409,798 B2
(45) Date of Patent: Sep. 10, 2019

(54) METHOD OF PROVIDING AN INDEX STRUCTURE IN A DATABASE

(71) Applicant: Capish International AB, Malmo (SE)

(72) Inventors: Staffan Gestrelius, Hjarup (SE); Carl Henrik Drews, Kavlinge (SE)

(73) Assignee: CAPISH INTERNATIONAL AB, Malmo (SE)

( * ) Notice: Subject to any disclaimer, the term of this patent is extended or adjusted under 35 U.S.C. 154(b) by 453 days.

(21) Appl. No.: 13/826,359

(22) Filed: Mar. 14, 2013

(65) Prior Publication Data

US 2013/0246438 A1 Sep. 19, 2013

Related U.S. Application Data

(60) Provisional application No. 61/611,865, filed on Mar. 16, 2012.

(51) Int. Cl.
*G06F 16/22* (2019.01)
*G06F 16/21* (2019.01)

(52) U.S. Cl.
CPC ........ *G06F 16/2237* (2019.01); *G06F 16/211* (2019.01)

(58) Field of Classification Search
CPC ........................ G06F 17/30592; G06F 16/2237
See application file for complete search history.

(56) References Cited

U.S. PATENT DOCUMENTS

| 5,960,428 | A | | 9/1999 | Lindsay |
| 5,963,935 | A | * | 10/1999 | Ozbutun et al. |
| 6,513,032 | B1 | * | 1/2003 | Sutter ............... G06F 17/30873 |
| 6,711,563 | B1 | * | 3/2004 | Koskas .......................... 707/769 |
| 6,879,976 | B1 | * | 4/2005 | Brookler ........... G06F 17/30501 |
| 2004/0024778 | A1 | * | 2/2004 | Cheo ................. G06F 17/30613 |
| 2010/0042789 | A1 | * | 2/2010 | Gonion et al. ................ 711/154 |

FOREIGN PATENT DOCUMENTS

WO 0072165 A1 11/2000

OTHER PUBLICATIONS

O'Neil, P et al., "Multi-table joins through bitmapped join indices," Sigmod Record, ACM, NY,NY, US Sep. 1, 1995, vol. 24, No. 3, pp. 8-11.
International Search Report and Written Opinion dated Jun. 5, 2013 for related Application No. PCT/EP2013/055455, 8 pgs.

* cited by examiner

*Primary Examiner* — Brittany N Allen
(74) *Attorney, Agent, or Firm* — Fredrikson & Byron, P.A.

(57) ABSTRACT

A method of providing an index structure in a database comprising a plurality of types of objects, each type of objects comprising at least one object. It comprises the steps setting one position of an identity index bit vector of each object in said database to one and all other positions to zero, said position being different for each object, and forming, for each object in said database, a relation index bit vector by combining all identity index bit vectors of objects that said each object is related to, wherein each bit vector has a length equal to the number of objects.

8 Claims, 18 Drawing Sheets

Fig. 19

| 1000111 | Resulting identity index vector |
|---------|--------------------------------|
| 1000000 | Object 1 |
| 0000100 | Object 4 |
| 0000010 | Object 6 |
| 0000001 | Object 7 |

Fig. 20

| 1110111 | Resulting identity index vector |
|---------|--------------------------------|
| 1000000 | Object 1 |
| 0100000 | Object 2 |
| 0000100 | Object 4 |
| 0010000 | Object 5 |
| 0000010 | Object 6 |
| 0000001 | Object 7 |

METHOD OF PROVIDING AN INDEX STRUCTURE IN A DATABASE

RELATED APPLICATIONS

This application claims priority to U.S. Provisional Patent Application No. 61/611,865 filed Mar. 16, 2012, the entire contents of which are incorporated herein by reference.

TECHNICAL FIELD

Most information created by knowledge producing organizations is captured by different information systems that are optimized for a specific part of the value chain. Using various integration techniques the information from the different information systems can be integrated into combined datasets that may be further queried and analyzed in order to unlock the complete knowledge produced by the organization. Since the datasets are combined from multiple sources and may be updated frequently the information system handling the combined datasets must be able to handle both frequent updates and structural changes in the datasets in a flexible and easy way. Also, in order to allow the knowledge in the combined datasets to be unlocked, the information system must allow the combined datasets to be queried and analyzed without imposing technical restrictions. The challenge of accessing datasets in this way is a reality in most knowledge producing organizations that seek to maximize the knowledge gained from the data produced.

PRIOR ART

The current solutions addressing these problems can, from a user's perspective, be divided into three major categories. The first category of solutions gives the user complete access to the underlying data model and does thus allow the datasets to be queried and analyzed in a flexible way. However, since the user must have a good knowledge of the underlying data model and the query language used often is complex, in order to allow complex queries, this category of solutions is generally considered hard to use for an average user. Also, since the queries and analysis performed on the datasets are done directly on the data model solutions of this category are sensitive to changes in the structure of the data.

The second category of solutions hides the underlying data model from the user and instead uses an information model tailored to a specific problem domain and uses predefined rules to translate between the information model and the data model. Since this category of solutions uses an interface tailored to query and analyze a specific problem domain the datasets can be queried and analyzed in an easy way. However, since the solution is created for a specific problem domain most systems in this category does not allow for the datasets to be queries and analyzed in a flexible way, but rather the kinds of queries and analysis possible are limited by the design of the information system. Further, solutions of this category are very sensitive to changes in the structure of the data since the system is created on top of predefined datasets.

The third category of solutions gives the user access to the underlying data model, but tries to do many complex tasks (e.g. connecting related parts of the dataset) automatically. This makes it possible to query and analyze the datasets in a flexible yet easy way since the user can access the data model directly, but does not need to know the complete data model or a complex query language in order to explore the datasets. However, with solutions of this category it is often very complex to circumvent the automatic behavior and create a query and analysis pattern other than the automatic behavior. Thus the flexibility available when querying and analyzing the datasets is limited by the design of the solution. Some solutions in this category, depending on the technical implementation, are also sensitive to changes in the structure of the datasets.

All categories of solutions described above impose restrictions on either the flexibility or the ease of querying and analyzing the datasets. Most of the available solutions do also suffer from being sensitive to structural changes of the datasets. Hence, there is a clear need to improve the situation by suggesting a new method and technology to query and analyze datasets in a flexible and easy way without imposing restrictions and while still allowing the datasets to change structurally.

SUMMARY OF THE INVENTION

An objective of the invention is to address and mitigate the shortcomings mentioned above and to provide a new method with supporting technology to make the knowledge in datasets more accessible.

In various embodiments a data model that resembles how the human brain associates and structures information can be used. By using such a data model the invention allows users to both find and to understand relevant information in the datasets in a natural way and thus allowing knowledge to be gained from the datasets. This kind of data model can be described by the following characteristics:

1. Each information concept, as defined by literature and understood by experts in that field, is modeled as a type of objects,
2. Each object belongs to a type of objects,
3. Each object contains enough information to make it meaningful and understandable,
4. Each object within a type of objects is not required to contain the same kind of attributes or classification of information,
5. Each object has information about which other objects that it is related to and what each relation stands for.

Since the data model described above does not impose any rigid schema on the information it is able to gracefully handle changes in the structure of the datasets. Also, since the data model resembles how the human brain builds knowledge, it is easy for users to understand the information even though no predefined schema exists.

A first aspect of the invention is a database engine, with appropriate index structures, that allows datasets using the data model described above to be queried and analyzed in a flexible, easy and responsive manner. The method of searching the database engine involves the following steps:

1. Specifying, using the data model, what kind of information should be retrieved and which filtering criteria that should be applied,
2. Submitting the above specification to the database engine,
3. Receiving a result from the database engine,
4. Presenting the result received to the user, In various embodiments the index structures are bitmap based.

Using the above described method for searching the database engine the user does not need knowledge of how the datasets are structured internally in the database engine. Instead the user specifies what kind of information that is of interest and what criteria that information must fulfill. This allows the user to focus on the information and does thus allow knowledge to be gained from the datasets.

A second aspect of the invention is the identification of a specific type of questions, which often need to be asked against datasets, along with a novel method and terminology to specify that type of questions. This specific type of questions operates on indirect relations in the datasets and can be used to gain knowledge that would be hidden if only direct relations where used. An example of a question of this type could be: For a specific type of objects how do attributes from other types of objects correlate. Another example could be: For objects of a specific type of objects, which fulfill a certain criteria, what attributes from another type of objects do they have in common. This type of questions are common while querying and analyzing datasets where a specific type of objects is put in the center of the analysis, for example patient centric analysis in clinical research and healthcare. This aspect of the invention can be used in conjunction with the other aspects of the invention, but it can also be used with other database engines and data models.

A third aspect of the invention is an extension to the second aspect of the invention that allows said database engine to handle the type of questions described above in a flexible, easy and responsive manner. This aspect of the invention allows this type of questions to be searched using the method of searching as described for the second aspect of the invention.

As a result of the aspects of the invention described above the invention achieves the objective and specifically allows the knowledge in the datasets to be accessed.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which:

FIG. 19 shows objects in FIG. 9 that have the identity index vectors 1000000 (object 1), 0000100 (object 4), 0000010 (object 6) and 0000001 (object 7).

FIG. 20 shows objects in FIG. 5 that show a first relation index vector having the value 1110000 (of object 2) is combined in a bitwise OR operation with a second relation index vector having the value 1000111 (of object 4) to produce the last bit vector 1110111. In the lower right hand side of the figure the objects that are present in the last bit vector are marked with a dash and dot line.

DETAILED DESCRIPTION

The most fundamental unit in the data model is an object. Each object belongs to a type of objects that represents the concept of the information contained by the object. The types of objects are created according to how that information is defined by literature and understood by experts in that field. In order to reflect how information often behaves different objects of the same type are not required to contain the same kind information. Each object also knows which other objects that it relates to and what that relation means, i.e. the information represented by the presence of the relation.

Figure 1:
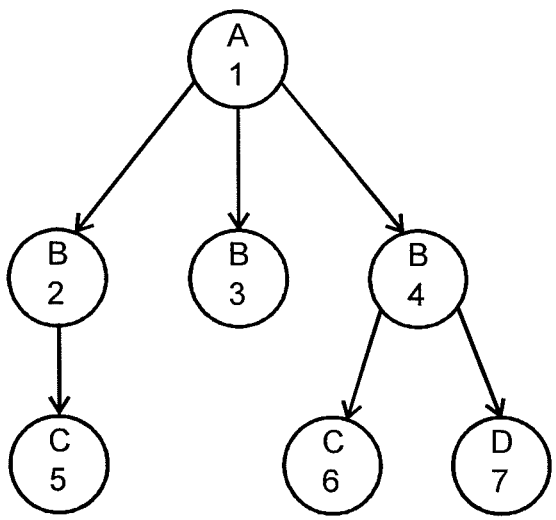
FIG. 1 is a diagram that shows an example of data represented in the type of data model described.

FIG. 1 gives a graphical example of how a dataset can be represented using this data model. Circles represent different objects and arrows represent directed relations between different objects. A letter in a circle indicates the type of the object and a number in the circle is a unique identifier of each object. FIG. 1 shows one object belonging to object type A with a unique identifier number 1, three objects belonging to object type B and identified by number 2, 3 and 4, respectively, two objects belonging to object type C and identified by number 5 and 6, respectively, and finally one object belonging to object type D and identified by number 7.

As shown in the figure different objects of the same type are not required to have the same relations. Also, as shown by the figure, data represented in this model can easily be rendered as a graph with directed relations, which resembles how the human brain associates and structures information.

In this kind of data model frequent updates of the dataset are easily handled, since each new object or chain of objects that is added to the dataset is added as a sub graph to the appropriate place in the graph. Structural changes of the dataset are also easily handled since each type of objects does not impose any rigid structure of the information contained within the object.

The invention specifically is intended for the identification of a specifics type of questions, which often need to be asked against datasets, along with a novel method and terminology to specify that type of questions. This type of questions can be described by the following characteristics:
1. Given a subset of data
2. Find all objects of a specific type that are included in or related to the subset of data
3. Create a new subset of data, from the complete dataset, that contains the objects, which were identified in the previous step, and all objects related to those objects The terminology used to describe this type of questions is defined by the following concepts:
The method of querying a dataset in this way is called reflective logic
The type of objects used in step 2 above is called the reflection point
The subset of data from step 1 above is said to be reflected in the reflection point during step 3

Reflective logic has been found to be an integral part of how different datasets need to be queried and analyzed in order to access the knowledge in a variety of fields, ranging from academia to pharmaceutical research and health care. In an analysis of e.g. clinical data a typical reflection point would be the patient, but other reflection points, e.g. the study, could also be of interest.

The following example, of analysis of clinical data, can show how reflective logic can be used to gain knowledge from a dataset. A clinical researcher might be interested in finding an explanation of why certain patients that where given a dose of a drug have a high blood pressure. Using the terminology defined above this problem can be stated as:
1. Find all blood pressure measurement that are considered high and that are connected to patients that were given a dose of the drug,
2. Reflect the objects that fulfill the previous condition in the type of objects that represent patients,
3. Analyze the resulting dataset, containing all information for the relevant patients, with the objective of finding an explanation for the high blood pressure.

In the example above the type of objects that represent patients are used as the reflection point and the measurements of interest are reflected in this reflection point in order to obtain all information related to those patients.

Figure 2:
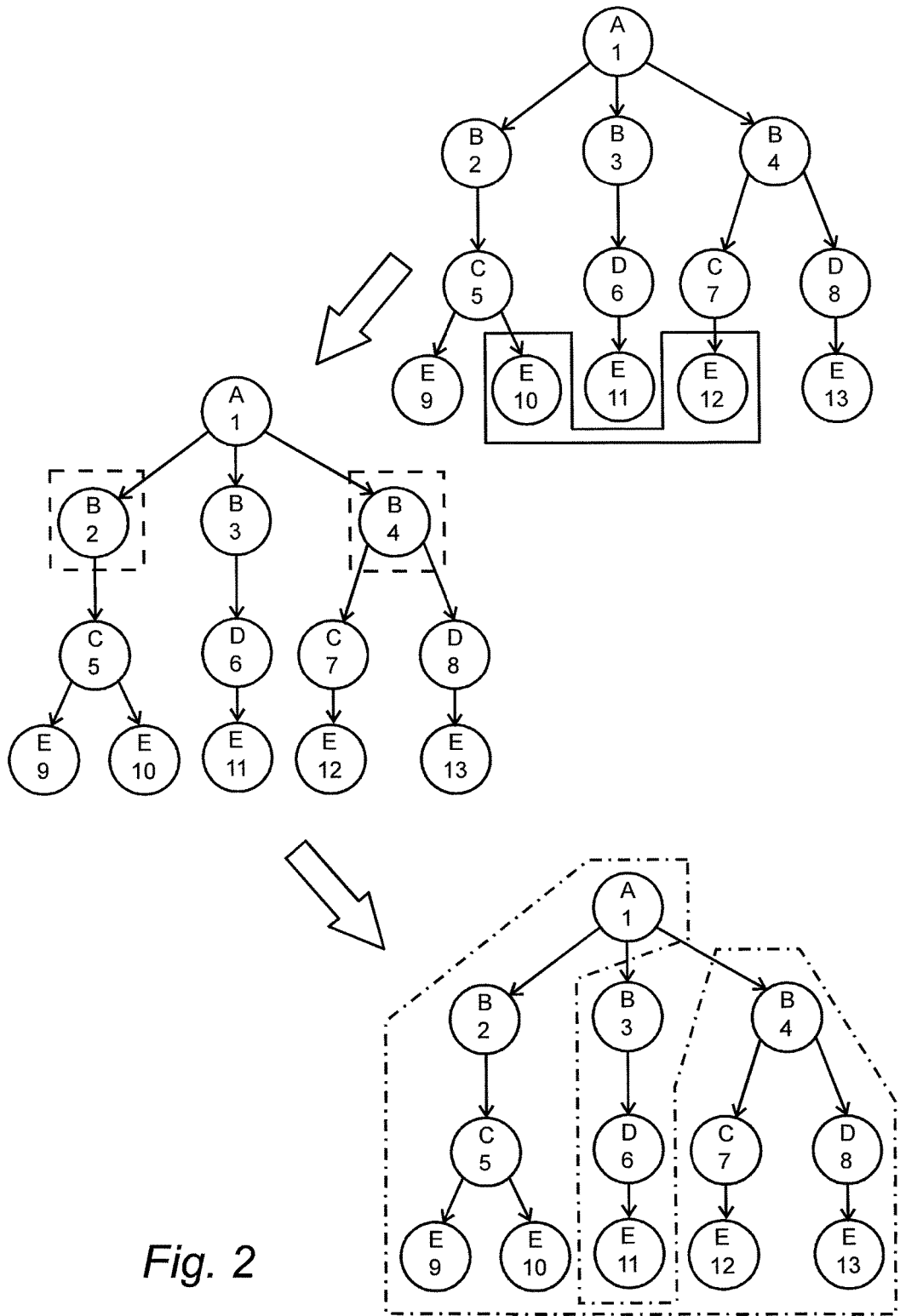
FIG. 2 is a diagram that shows an example of a reflection of a subset of data in objects of type B.

FIG. 2 shows an example of how reflective logic might transform a dataset. In this example a subset of data is reflected in objects of the type labeled B. An upper right section of the figure shows the selected subset of data within a continuous line. A left mid-section of the figure shows the objects of the type labeled B indicated by dashed line that are related to the subset of data and that will be used while reflecting the dataset. The lower right hand side of the figure shows the result, indicated with a dash and dot line, of the subset being reflected in objects of the type labeled B. By interpreting the different types of objects according to the following FIG. 2 can be used to describe the example above:
Objects of the type labeled A represent the clinical study that was performed
Objects of the type labeled B represent the patients
Objects of the type labeled C and D represent different methods for measuring blood pressure
Objects of the type labeled E represent blood pressure measurements,
Objects marked with continuous line, i.e. identified by 10 and 12, represent high blood pressure measurements,
Objects marked with dashed lines, i.e. objects identified by 2 and 4, represent patients that had a high blood pressure measurement, and
Objects marked with dash and dot lines represent objects related to the patients that had a high blood pressure measurement.

The description and examples of reflective logic use the data model described above, but the invention comprises also the use of reflective logic on other data models.

As stated above an aspect of the innovation is a novel method of indexing relations and using those indexes for both ordinary questions and reflective logic in order to allow a database engine to utilize the aspects of the invention defined above.

The index structures used are bitmap based, which means that they consist of vectors of bits where each bit may be either zero or one and each bit is mapped to a specific meaning. Further the length of the bit vector, i.e. the number of bits in the vector, is always a multiple of the word length of the targeted processor architecture. As an example this means that for a 64-bit processor architecture the length of the bit vector will always be a multiple of 64. This alignment of the length of the bit vector results in that logical operations on bit vectors can be done using optimized bitwise operations, e.g. AND or OR. However, in order to ease understanding the concept of the different index structures the bit vectors have not been aligned to the word length in the examples used below.

A couple of different bit map index structures are created in order for the database engine to handle both ordinary questions and reflective logic. The two index structures that are most prominent to the invention are the relation index and the identity index.

The identity index consists of index vectors that each defines one object in a dataset. Each index vector is a bit vector in which one bit is set to one and all other bits are set to zero. In this way the bit set to one will uniquely identify the object in the dataset. Since the identity index uses one unique bit to identify each object in a dataset multiple objects may be identified by a single bit vector where multiple bits are set to one. Such a bit vector can be created by combining multiple identity index vectors using bitwise OR operations.

The relation index consists of index vectors that each defines what objects a specific object is related to. Each relation index vector contains the combination of all identity index vectors of the objects that the current object is related to. This means that a relation index vector is a bit vector that uniquely identifies all objects that the current object is related to using the scheme defined above.

For each type of objects an index vector consisting of the combination of the identity index vectors of all objects of that type is created. On the basis of these index structures it is possible to determine which objects of a specific type that are present in a subset of data.

Figure 3:
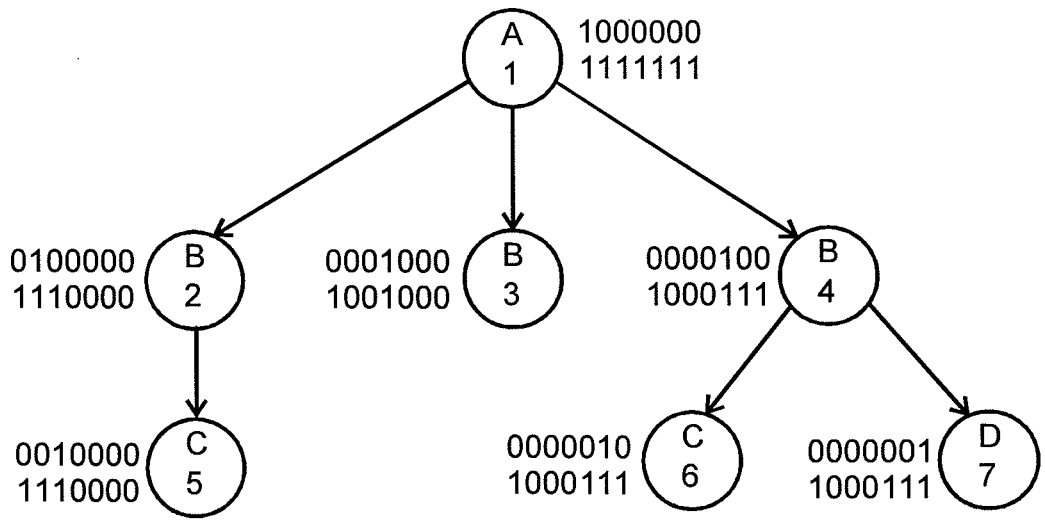
FIG. 3 is a diagram that shows an example of how the identity and relation index, used by the database engine, may look for each object in a dataset.

FIG. 3 shows an example of an identity and a relation index for each object in a dataset. The first row of zeros and ones is the identity index and the second row of zeroes and ones is the relation index. As can be seen in this figure each object is identified by exactly one bit that is set to one in the identity vector. As an example, the identity index vector 0001000 uniquely identifies the object of type B identified by the number 3. The figure also shows that each object in the dataset has a unique identity index vector. This allows the relation index to efficiently be interpreted as a vector of the identities of all objects that the current object relates to.

In the embodiment shown in FIG. 3 object 1 of object type A is given the identity index vector 1000000 interpreted as a one in a first bit position and zeros in all other positions. The index vector has a 7 bit length. A first object of object type B is depicted 2 and is given the identity index vector 0100000 and a second object of object type B is depicted 3 and is given the identity index vector 0001000. The remaining objects have corresponding identity index vectors.

Since the identity index uses one unique bit to identify each object in a dataset multiple objects may be identified by a single bit vector where multiple bits are set to one. Such a bit vector can be created by combining multiple identity index vectors using bitwise OR operations. For example, in FIG. 3 the bit vector 0101100 would uniquely identify the objects identified by the numbers 2, 3 and 4.

The relation index vector of object 1 (1000000) is determined by a combination of the identity indexes of all objects that are related to object 1. Object 1 has a relation with all other objects including itself. As a result each position of the relation index vector of object 1 will be set to one because each related object will contribute with a one from its identity index vector.

Object 4 (0000100) has a relation with object 1 (1000000), resulting in a one in the first position of the relation index vector, with object 6 (0000010), resulting in a one in the sixth position, with object 7 (0000001), resulting in a one in the last position, and with itself (0000100) resulting in a one in the fifth position. The final relation index vector of object 4 thus will be 1000111 as shown in FIG. 3. All other relation index vectors are formed in the same manner. As a further example, the object identified by the number 2 has a relation index vector of 1110000 which corresponds to the identity index vector of the objects identified by the numbers 1, 2 and 5.

When creating the relation index it is important to define when two objects are related and when they are not related. For example, in FIG. 3 all objects of the type labeled B are related through the object identified by the number 1 yet the relation index vectors for the objects of type B does not contain this relation. The reason for this is that, in the data model used in the examples, an object is said to be related to its parents and children and all objects related to those except siblings of the same type as the object itself.

This definition of relations is more easily understood if the different objects in FIG. 3 are interpreted as set out below:
  Objects of the type labeled A represent a clinical study that was performed
  Objects of the type labeled B represent patients in the study
  Objects of the type labeled C represent the height of a patient
  Objects of the type labeled D represent the weight of a patient Using the interpretation above it is clear that the different patients represented by the objects identified by the numbers 2, 3 and 4 should not be directly related nor should the height of the patient identified by the number 2 be related to the height of the patient identified by the number 4. However the height and weight of the patient identified by the number 4 should be related.

A third index called object type identity index is also created in order for the database engine to use the other indexes more efficiently. This index consists of one index vector for each type of objects, where each index vector is created from the combination of the identity index vector of all objects of that type. This means that an object type identity index vector is a bit vector that uniquely identifies all objects of a specific type using the scheme defined above. These index structures are used to be able find which objects of a specific type are present in a subset of data. As an example, in FIG. 3 the object type identity index for the objects of type C would be 0010010, which is a combination of the identity index vectors of the two objects of type C.

As stated previously the bit vectors used to represent the different index vectors are aligned to the word length of the targeted processor architecture. This is done by the following steps:
  1. If the number of objects is a multiple of the word length then no further action is needed
  2. If the number of objects is not a multiple of the word length then set the number of bits to the lowest multiple of the word length that can represent all objects and set the extra bits to zero Using the above alignment method the presence of the extra bits added will not affect the indexes since a bit set to zero will be treated as if there is no object present.

The database engine utilizes the three index structures described above in order to answer queries of the following characteristics:
  1. Given one or more filtering criteria, i.e. restrictions in the dataset that correlates to one or more subsets of the dataset
  2. Given how the filtering criteria should be combined
  3. Find the subset of objects that fulfill each filtering criteria
  4. Find all objects that are either included in or related, directly or indirectly, to each subset
  5. Combine the subsets from step 4 using logical set operations according to the information from step 2

Figure 4:
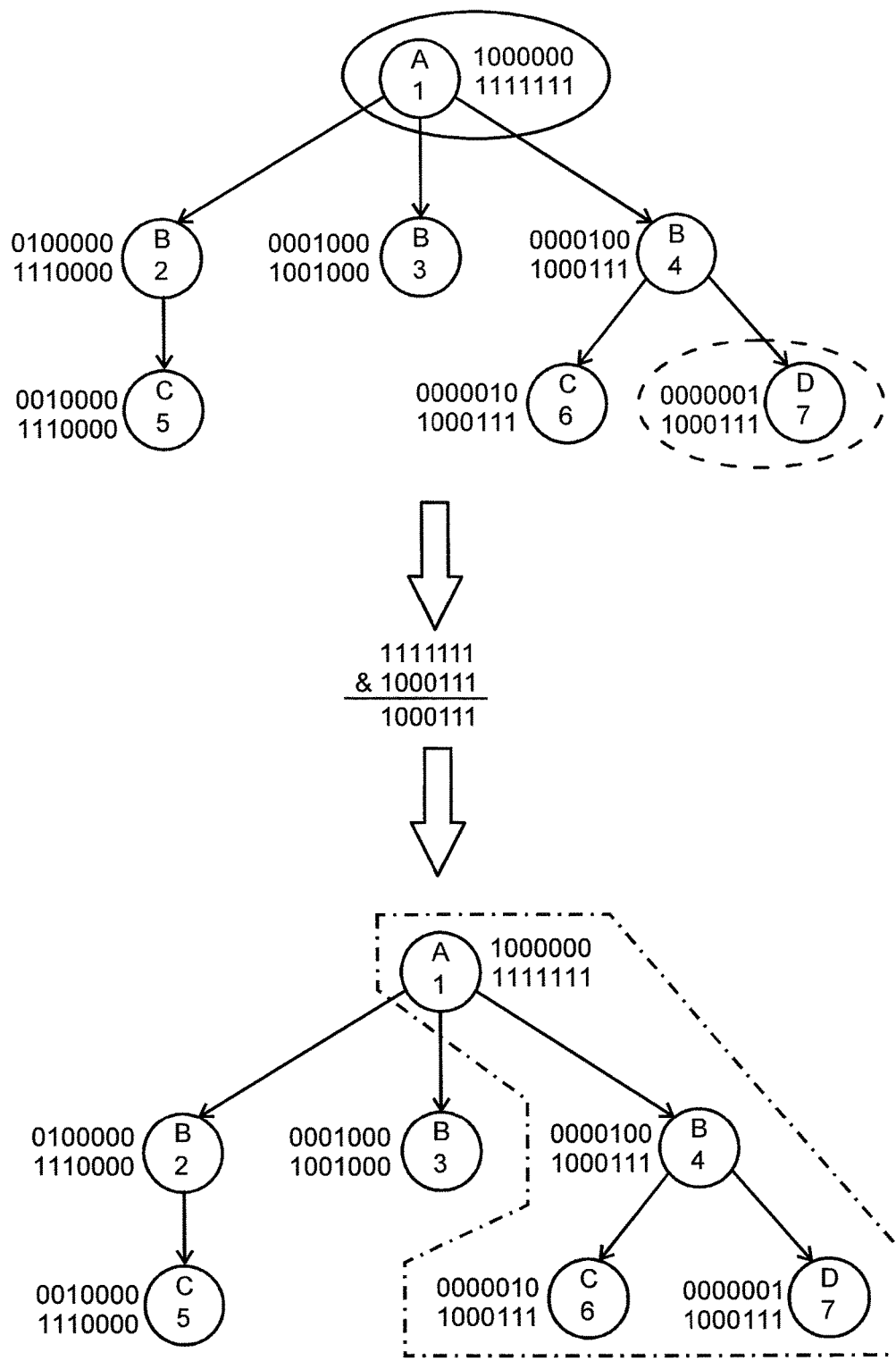
FIG. 4 is a diagram that shows an example of how the database engine can use the relation index to filter the dataset and find all related information.

Questions of the type described above often needs to be asked against datasets in order to obtain knowledge from the dataset. As an example, consider a dataset of medical records where the height and weight of patients have been recorded. A physician might be interested in finding all information related to a low weight measurement in order to find out if any actions need to be taken. FIG. 4 shows an example of how the database engine can utilize the identity index and the relation index in order to answer such a query. If the information in the figure is interpreted according to the following then the example above can be used to further explain the figure:
  Objects of the type labeled A represent hospitals that collected the information
  Objects of the type labeled B represent patients
  Objects of the type labeled C represent the height of a patient
  Objects of the type labeled D represent the weight of a patient
  The object of the type labeled D that is identified by the number 7 is considered to be a low weight measurement
  Two filtering criteria are defined to be combined using AND
    The information should be collected at a certain hospital
    The weight measurement should be considered to be low The objects marked with a continuous line match the first filtering criteria The objects marked with a dash line match the second filtering criteria The objects with dash and dot line are the result of the query FIG. 4 shows an example of how the relation index and the identity index can be used to find all object that fulfill, either directly or indirectly, two criteria. A further description is set out below in relation to the description of FIG. 9. In the upper part of the figure the objects within a continuous line ellipse and a dashed line ellipse symbolize the two criteria. A first object (continuous line) has the relation index vector 1111111 (object 1) and a second object (dashed line) has the relation index vector 1000111 (object 7). In the middle part of the figure the relation index vectors of those two sets of objects are combined using a bitwise AND operation to produce a resulting identity index vector of 1000111 and in the lower part of the figure the objects that match the resulting identity index vector are marked with a dash and dot line. These objects have the identity index vectors 1000000 (object 1), 0000100 (object 4), 0000010 (object 6) and 0000001 (object 7) see FIG. 19.

Figure 5:
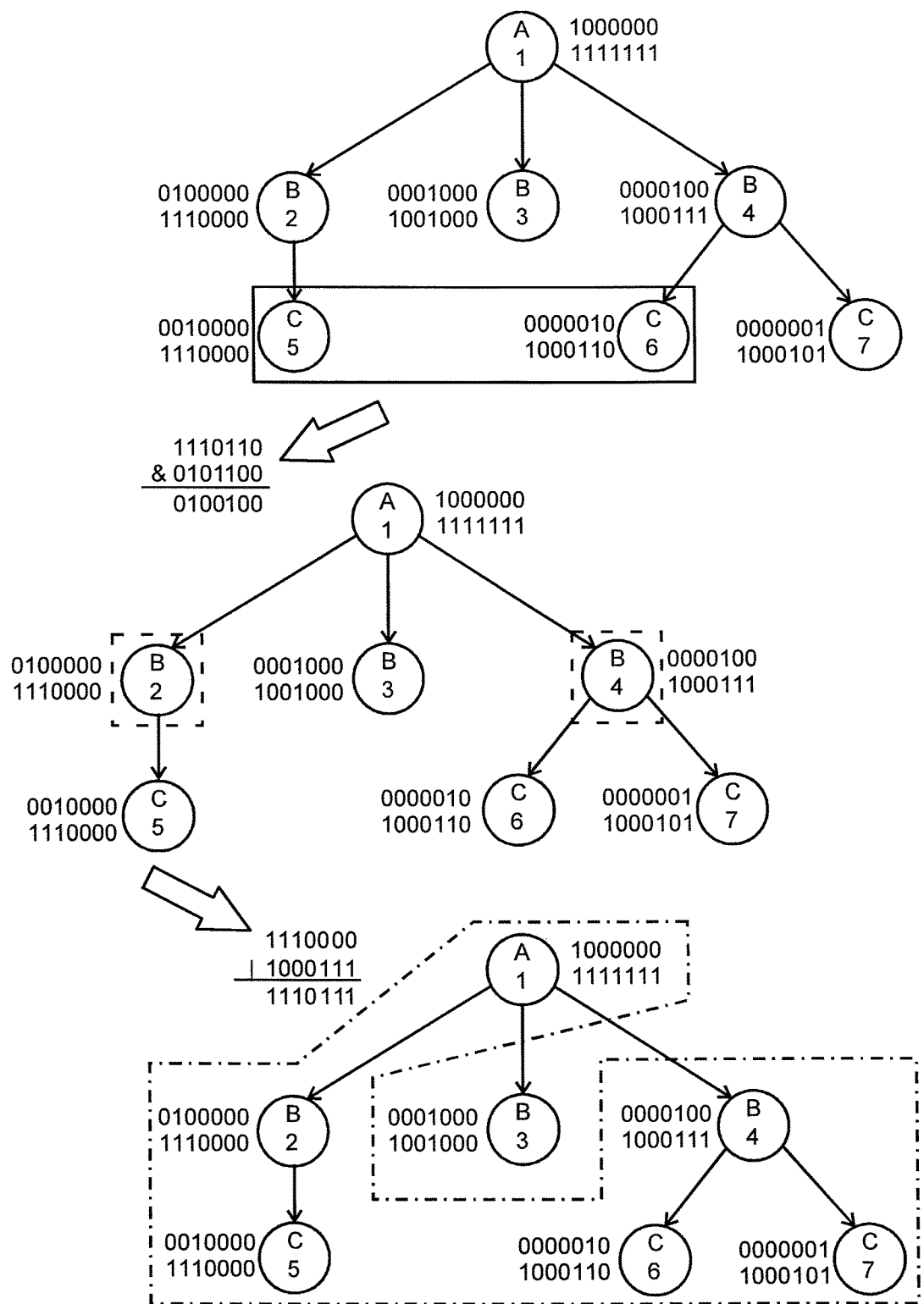
FIG. 5 is a diagram that shows an example of how the database engine can reflect a subset of data in objects of type B.

FIG. 5 shows an example of how the database engine can utilize the index structures described previously to answer a question containing reflective logic. If the information in the figure is interpreted according to the following then the example above can be used to further explain the figure:

Objects of the type labeled A represent the clinical study that was performed

Objects of the type labeled B represent the patients

Objects of the type labeled C represent blood pressure measurements

The objects of the type labeled C that are identified by the numbers 5 and 6 are considered to be high blood pressure measurements The objects marked with continuous line match the filtering criteria, in this case blood pressure measurements that are considered to be high The objects marked with dash line represent objects, of the type of objects that the query is reflected in, that are related to the objects matched by the filtering criteria The objects marked with dash and dot line are the result of the query In the upper side of the figure the objects that match the filtering criteria are identified. The database engine will then combine, using bitwise OR operations, the relation index vectors of all objects that match the filtering criteria. In this case the database engine will combine the two relation index vectors 1110000 and 1000110 using a bitwise OR operation into a new bit vector which will be 1110110. This bit vector will then be combined with the object type identity index vector for the reflection point using a bitwise AND operation. The resulting bit vector will contain the unique identity of all objects, of the type of objects that the query is reflected in, that are related to the objects that match the filtering criteria.

In this case the object type identity index vector is 0101100 and that will be combined, using a bitwise AND operation, with 1110110 which will give the resulting bit vector 0100100. This step is shown in the middle left part of the figure. As the next step the database engine will use the bit vector generated by the last step with the identity index in order to find the relation index vectors of all objects of the type of objects that the query is reflected in. The database engine will then combine all these relation index vectors using bitwise OR operations in order to retrieve a bit vector that contains the unique identity all objects that match the query.

In this case the relation index vectors of the objects, of the type of objects that the query is reflected in, that are present in the last bit vector are 1110000 and 1000111. Combining these two relation index vectors using a bitwise OR operation yields a bit vector of 1110111, which contains the unique identity of all objects that match the query. This step is shown in the lower left hand side of the figure. The last step is using the identity index to find all objects that are present in a last bit vector. The result of the last step is shown in the lower side of the figure.

In the middle section of the figure the objects of the type labeled B that match the result bit vector are marked with dashed lines. Those two objects, object 2 (0100000) and object 4 (0000100) will be used while reflecting the selected dataset. A first relation index vector having the value 1110000 (of object 2) is combined in a bitwise OR operation with a second relation index vector having the value 1000111 (of object 4) to produce the last bit vector 1110111, see FIG. 20. In the lower right hand side of the figure the objects that are present in the last bit vector are marked with a dash and dot line.

Questions using reflective logic with multiple reflection points must sometimes be asked against datasets in order to obtain a higher level of knowledge from the dataset. As an example, consider a dataset containing information from clinical studies where some of the studies have measured the blood pressure of the patients. A clinical researcher might be interested in looking at patients with a high blood pressure if they were part of a study where a certain drug where administered. This question can be formulated, using the terminology defined previously for the reflective logic, as:

1. Find all objects correlating to administration of the drug in question
2. Use the type of objects representing clinical studies as the reflection point and reflect the objects from step 1 in this reflection point
3. Find all objects correlating to high blood pressure measurements
4. Use the type of objects representing patients as the reflection point and reflect the objects from step 3 in this reflection point
5. Find all objects that are present in both the result from step 2 and from step 4
6. Analyze the information from step 5

Figure 6:
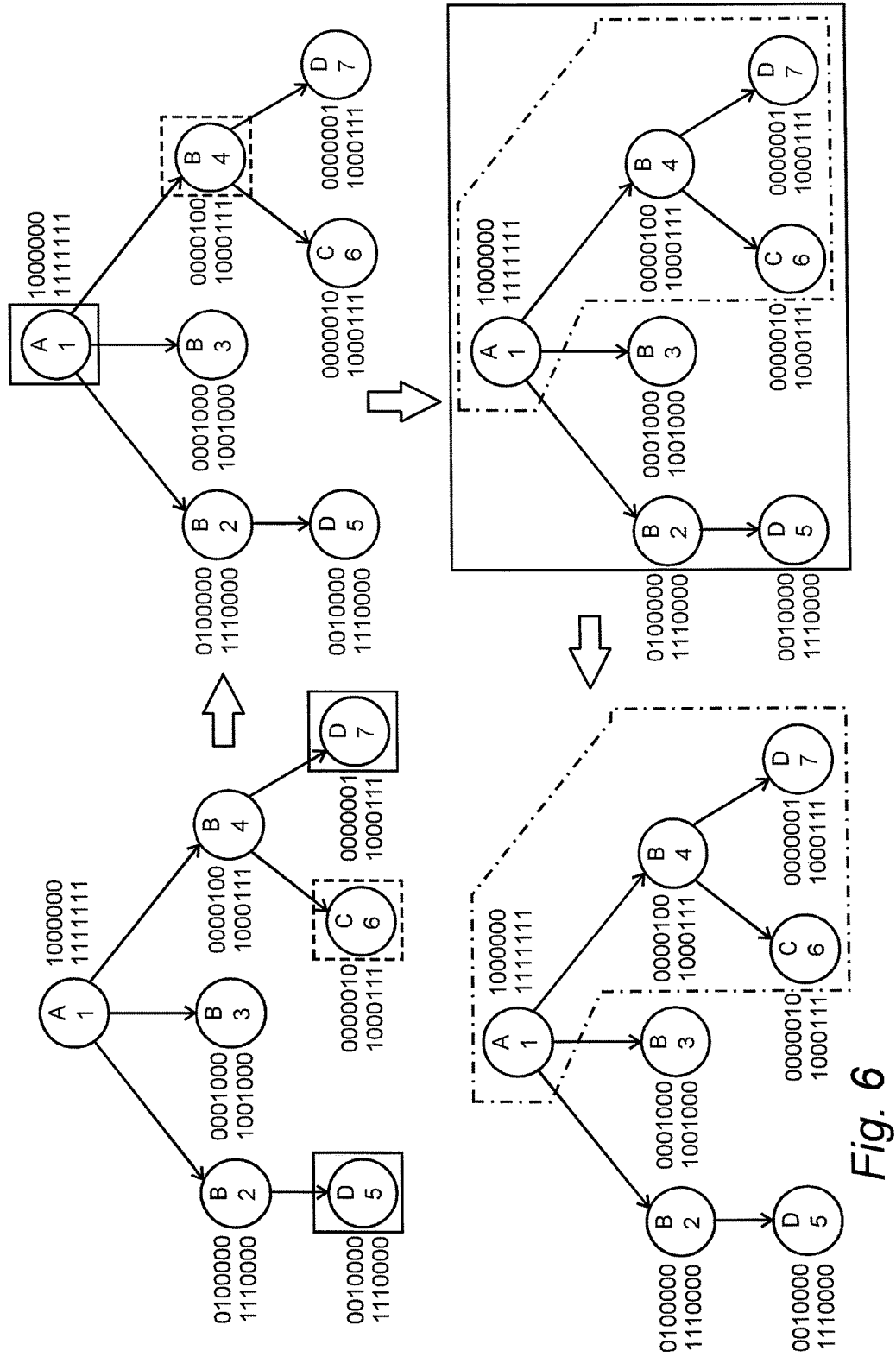
FIG. 6 is a diagram that shows an example of how the database engine can reflect two subsets of data using two different reflection points.

FIG. 6 shows an example of how the database engine can utilize the index structures described previously to answer a question as the one described above. If the information in the figure is interpreted according to the following then the example above can be used to further explain the figure:

Objects of the type labeled A represent the clinical studies that were performed Objects of the type labeled B represent the patients Objects of the type labeled C represent blood pressure measurements Objects of the type labeled D represent administration of the drug in question The object of the type labeled C that is identified by the numbers 6 is considered to be a high blood pressure measurement The objects marked with continuous line are part of the query that is reflected in the type of objects that represent the clinical studies The objects marked with dash line are part of the query that is reflected in the type of objects that represent the patients The objects marked with dash and dot line are the result of the query The upper left hand side of the figure identifies the objects that match the two query parts The upper right hand side of the figure identifies the objects that will be used as reflection points The lower right hand side of the figure identifies the objects that are part of the two sets, representing the two query parts, after the reflection The lower left hand side of the figure identifies the result of the question In the upper left hand side of the figure the objects that match the two parts of the query are identified. The objects marked with continuous line represent the administration of the drug in question and the object marked with dash line represents the high blood pressure measurement. The database engine will first combine, using bitwise OR operations, the relation index vectors of all objects that match each part of the query. In this case the database engine will combine the two relation index vectors 1110000 and 1000111 using a bitwise OR operation into a new bit vector which will be 1110111. This bit vector is used for the part of the query that will be reflected in the type of objects representing the clinical studies.

For the part of the query that will be reflected in the type of objects that represents patients the database engine does not have to combine any relation index vectors since only one object match the filtering criteria and that object has a relation index vector of 1000111. As the next step the database engine will combine, using bitwise AND operations, the bit vectors just created with the object type identity index vectors for the correlating reflection point. In this case the object type identity index vector for the type of objects representing clinical studies is 1000000 and the object type identity index vector for the type of objects representing patients is 0101100.

Thus the bit vector 1110111 will be combined with 1000000 yielding a bit vector of 1000000 and the bit vector 1000111 will be combined with 0101100 yielding a bit vector of 0000100. The objects correlating to the bit vectors from the last step are shown in the upper right hand side of the figure. As the next step the database engine will use the bit vectors generated by the last step with the identity index in order to find the relation index vectors of all objects of the type of objects that each query part is reflected in. The database engine will then combine all these relation index vectors, for each query part, using bitwise OR operations in order to retrieve bit vectors that contains the unique identity all objects that match each query part.

In this case only one object, of the type of objects representing clinical studies, matches the bit vector so no combinations are needed. This object has a relation index vector of 1111111. Further only one object, of the type of objects that represents patients, matches the bit vector and thus no combinations are needed. This object has a relation index vector of 1000111. The objects whose identity index vectors are present in these two bit vectors are shown in the lower right hand side of the figure.

As the last step the database engine will combine the bit vectors from the last step using bitwise AND or OR operations depending on how the two query parts should be combined. In this case the query parts should be combined by a bitwise AND operation since the question was formulated as the combination of the two query parts. This means that the two bit vectors 1111111 and 1000111 will be combined using a bitwise AND operation yielding the result 1000111. This new bit vector contains the unique identity of all objects that match the query. The result of the query is shown in the lower left hand side of the figure.

Figure 7:
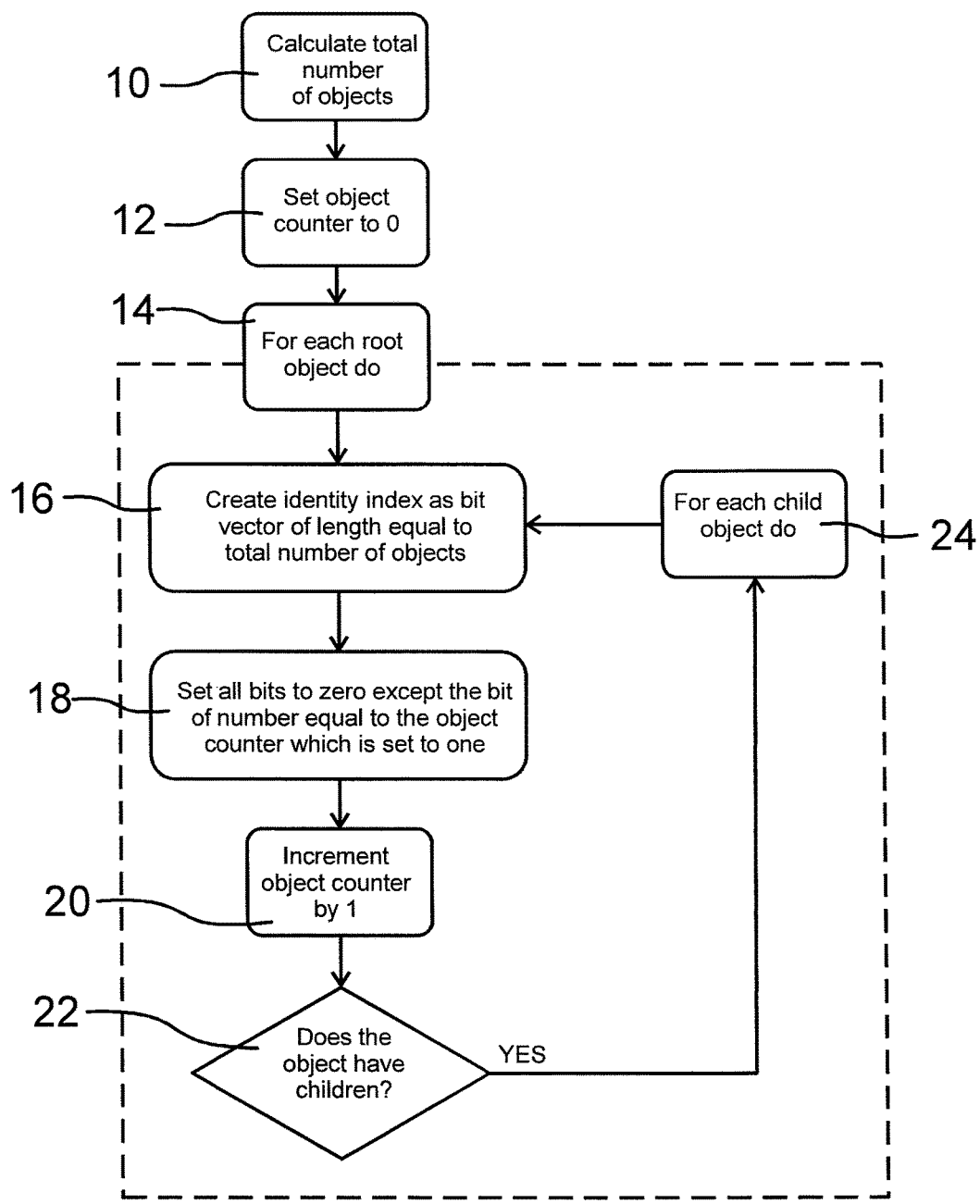
FIG. 7 is a diagram that shows how the identity index, used by the database engine, is created.

FIG. 7 is a schematic representation of how the database engine constructs the identity index vectors. In block 10 the total number of objects in the database is calculated and in block 12 an object counter is set to 0. A first iteration process is then started in block 14. A plurality of process steps are taken for or each root object in the database starting in block 16 in which an identity index vector is created in the form of a bit vector. The length of the identity index vector, i.e. the number of bits, is set to be equal to the total number of objects in the database as calculated in in block 10.

The identity index vector is given a value in block 18. All bits of the vector are set to zero except a single bit corresponding to the present value of the object counter. This single bit is set to one. Thus, only one bit position in the identity index vector is set to one while all other bits are set to zero. Then, in block 20 the object counter is incremented by one. In block 22 there is a question asked whether the present object of the iteration process has children. If this is the case all iteration steps of blocks 16 to 22 then are repeated for each child object as set out in block 24. The identity index vector of all objects of the database is given a value in line with the root objects. If no children exist the iteration process continues. Following this schematic for the dataset represented in FIG. 1 would yield the following steps:

Calculate the total number of objects in the dataset, in this case 7 objects

Create an object counter and set its value to 0

Start with the first root object, in this case the object identified by the number 1

Create an identity index vector for the first root object, in this case the object identified by the number 1

The bit vector should be of length equal to the total number of objects, in this case 7

Set all bits to zero except the bit of the same number as the object counter, in this case bit number 0

The resulting bit vector is 1000000

Increment the object counter by one, in this case the new value is 1

Since the first root object contains children continue the process for each child Create an identity index vector for the first child, in this case the object identified by the number 2

The bit vector should be of length equal to the total number of objects, in this case 7

Set all bits to zero except the bit of the same number as the object counter, in this case bit number 1

The resulting bit vector is 0100000

Increment the object counter by one, in this case the new value is 2

Since the current object contains children continue the process for each child

Create an identity index vector for the first child, in this case the object identified by the number 5

The bit vector should be of length equal to the total number of objects, in this case 7

Set all bits to zero except the bit of the same number as the object counter, in this case bit number 2

The resulting bit vector is 0010000

Increment the object counter by one, in this case the new value is 3

Since the current object does not contain any children continue the process for the parent, in this case the object identified by the number 2

Since the current object does not contain any more children continue the process for the parent, in this case the object identified by the number 1

Create an identity index vector for the second child, in this case the object identified by the number 3
- The bit vector should be of length equal to the total number of objects, in this case 7
- Set all bits to zero except the bit of the same number as the object counter, in this case bit number 3
- The resulting bit vector is 0001000

Increment the object counter by one, in this case the new value is 4

Since the current object does not contain any children continue the process for the parent, in this case the object identified by the number 1

Create an identity index vector for the third child, in this case the object identified by the number 4
- The bit vector should be of length equal to the total number of objects, in this case 7
- Set all bits to zero except the bit of the same number as the object counter, in this case bit number 4
- The resulting bit vector is 0000100

Increment the object counter by one, in this case the new value is 5

Since the current object contains children continue the process for each child

Create an identity index vector for the first child, in this case the object identified by the number 6
- The bit vector should be of length equal to the total number of objects, in this case 7
- Set all bits to zero except the bit of the same number as the object counter, in this case bit number 5
- The resulting bit vector is 0000010

Increment the object counter by one, in this case the new value is 6

Since the current object does not contain any children continue the process for the parent, in this case the object identified by the number 4

Create an identity index vector for the second child, in this case the object identified by the number 7
- The bit vector should be of length equal to the total number of objects, in this case 7
- Set all bits to zero except the bit of the same number as the object counter, in this case bit number 6
- The resulting bit vector is 0000001

Increment the object counter by one, in this case the new value is 7

Since the current object does not contain any children continue the process for the parent, in this case the object identified by the number 4

Since the current object does not contain any more children continue the process for the parent, in this case the object identified by the number 1

Figure 8:
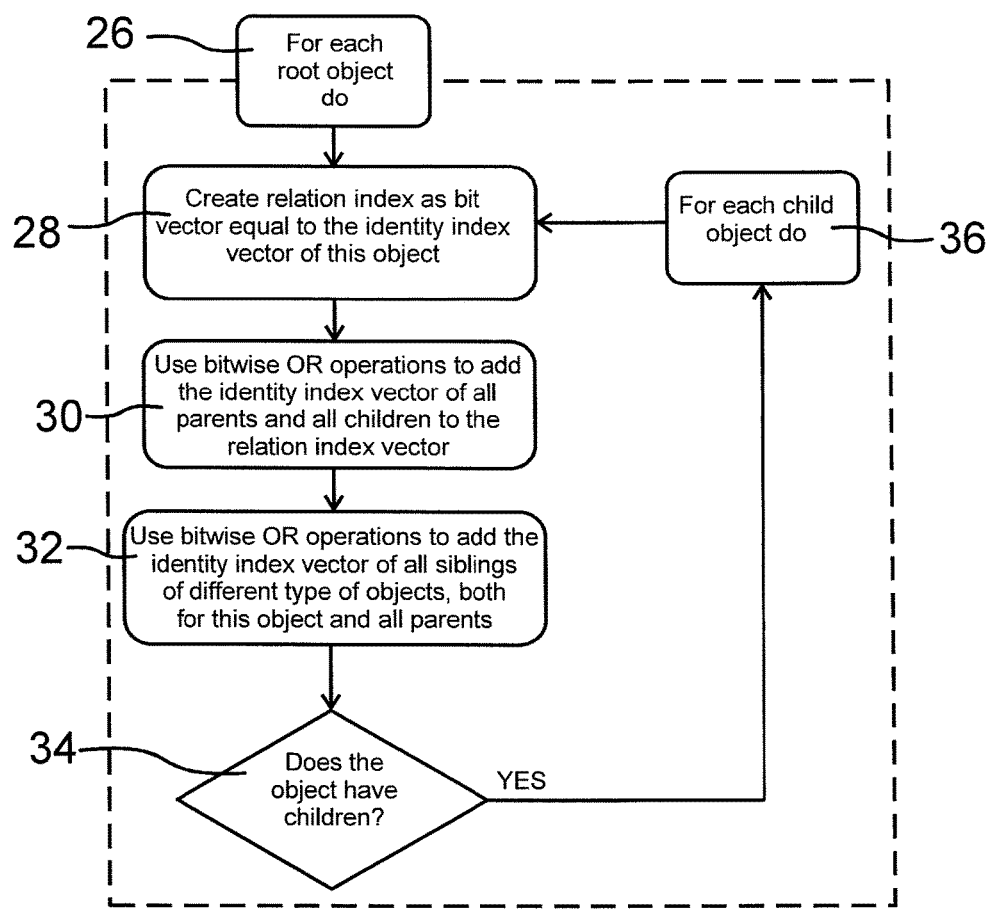
FIG. 8 is a diagram that shows how the relation index, used by the database engine, is created.

Since the first root object does not contain any more children continue to the next root object Since no more root objects exist the process is complete FIG. 8 shows how the database engine constructs the relation index vectors. The relation index is created for all objects of the database starting with the root object(s). A second iteration process is started in block 26. A plurality of process steps are taken for each root object in the database starting in block 28 in which a relation index vector is created. The relation index vector is a bit vector equal to the identity index vector of the present object in the iteration process.

The created relation index vector is completed in block 30 with identity index vectors of parents and all children of the present object in the iteration process. Bitwise OR operations can be used when the identity index vectors are added. In a final step as shown in block 32 also identity index vectors of all siblings of different type of objects.

In block 34 there is a question asked whether the present object of the iteration process has children. If this is the case all iteration steps of blocks 28 to 34 then are repeated for each child object as set out in block 36. After these steps all objects in the database have been assigned a unique identity index vector value and a relation index vector value. The relation index vectors then can be used to process the database. Following this schematic for the dataset represented in FIG. 1 would yield the following steps and create the same relation index vectors as shown in FIG. 3:

Start with the first root object, in this case the object identified by the number 1

Create a relation index vector for the first root object, in this case the object identified by the number 1
- Set the relation index vector to be equal to the index vector of the object, in this case 1000000
- Use bitwise OR operations to add the identity index vectors for all parents and all children, in this case 0100000, 0010000, 0001000, 0000100, 0000010 and 0000001
- Use bitwise OR operations to add the identity of all siblings of different type of objects and all siblings of different kind of objects for all parents, in this case none
- The resulting bit vector is 1111111

Since the first root object contains children continue the process for each child Create a relation index vector for the first child object, in this case the object identified by the number 2
- Set the relation index vector to be equal to the index vector of the object, in this case 0100000
- Use bitwise OR operations to add the identity index vectors for all parents and all children, in this case 1000000 and 0010000
- Use bitwise OR operations to add the identity of all siblings of different type of objects and all siblings of different kind of objects for all parents, in this case none
- The resulting bit vector is 1110000

Since the current object contains children continue the process for each child

Create a relation index vector for the first child object, in this case the object identified by the number 5
- Set the relation index vector to be equal to the index vector of the object, in this case 0010000
- Use bitwise OR operations to add the identity index vectors for all parents and all children, in this case 1000000 and 0100000
- Use bitwise OR operations to add the identity of all siblings of different type of objects and all siblings of different kind of objects for all parents, in this case none
- The resulting bit vector is 1110000

Since the current object does not contain any children continue the process for the parent, in this case the object identified by the number 2

Since the current object does not contain any more children continue the process for the parent, in this case the object identified by the number 1

Create a relation index vector for the second child object, in this case the object identified by the number 3
- Set the relation index vector to be equal to the index vector of the object, in this case 0001000
- Use bitwise OR operations to add the identity index vectors for all parents and all children, in this case 1000000
- Use bitwise OR operations to add the identity of all siblings of different type of objects and all siblings of different kind of objects for all parents, in this case none
- The resulting bit vector is 1001000

Since the current object does not contain any children continue the process for the parent, in this case the object identified by the number 1

Create a relation index vector for the third child object, in this case the object identified by the number 4
- Set the relation index vector to be equal to the index vector of the object, in this case 0000100
- Use bitwise OR operations to add the identity index vectors for all parents and all children, in this case 1000000, 0000010 and 0000001
- Use bitwise OR operations to add the identity of all siblings of different type of objects and all siblings of different kind of objects for all parents, in this case none
- The resulting bit vector is 1000111

Since the current object contains children continue the process for each child

Create a relation index vector for the first child object, in this case the object identified by the number 6
- Set the relation index vector to be equal to the index vector of the object, in this case 0000010
- Use bitwise OR operations to add the identity index vectors for all parents and all children, in this case 1000000 and 0000100
- Use bitwise OR operations to add the identity of all siblings of different type of objects and all siblings of different kind of objects for all parents, in this case 0000001
- The resulting bit vector is 1000111

Since the current object does not contain any children continue the process for the parent, in this case the object identified by the number 4

Create a relation index vector for the first child object, in this case the object identified by the number 7
- Set the relation index vector to be equal to the index vector of the object, in this case 0000001
- Use bitwise OR operations to add the identity index vectors for all parents and all children, in this case 1000000 and 0000100
- Use bitwise OR operations to add the identity of all siblings of different type of objects and all siblings of different kind of objects for all parents, in this case 0000010
- The resulting bit vector is 1000111

Since the current object does not contain any children continue the process for the parent, in this case the object identified by the number 4

Since the current object does not contain any more children continue the process for the parent, in this case the object identified by the number 1

Figure 9:
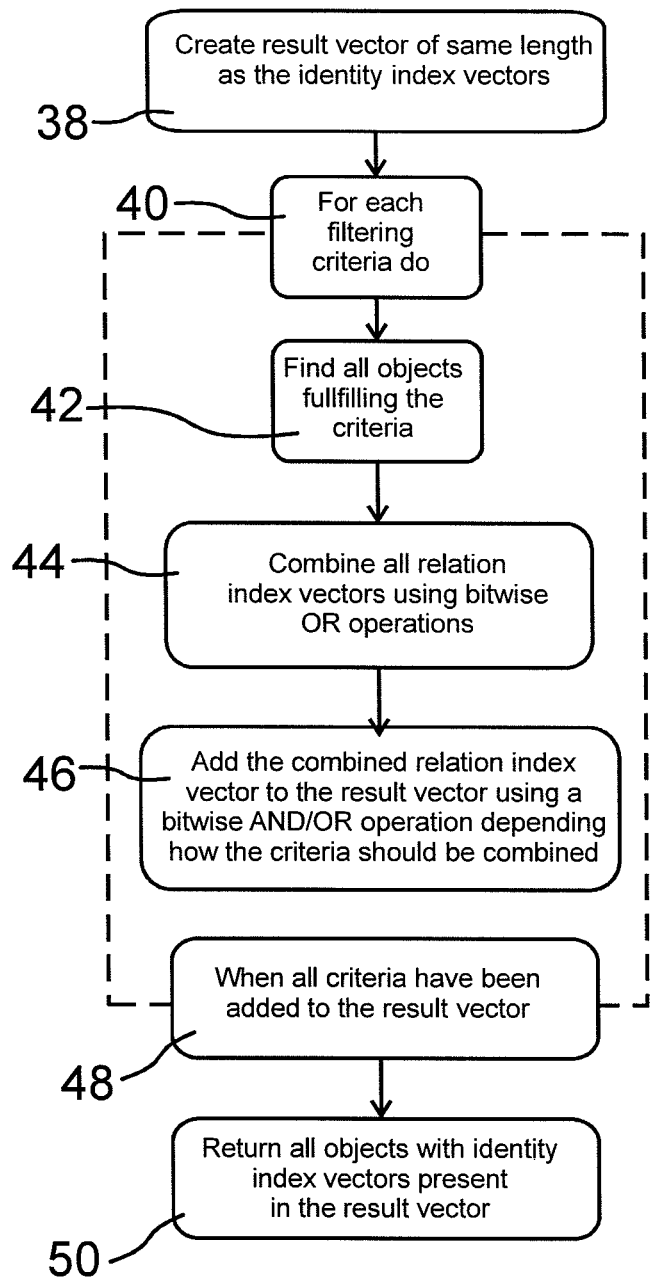
FIG. 9 is a diagram that shows how the database engine can use the index structures to answer a search query.

Since the first root object does not contain any more children continue to the next root object Since no more root objects exist the process is complete FIG. 9 shows how the database engine utilizes the different index structures in order to answer a query such as the one described above. Following this schematic for the example above and the dataset represented in FIG. 4 would yield the following steps:

Create a result vector as a bit vector of same length as the identity index vectors For the first filtering criteria find all objects that fulfill the criteria, in this case the object identified by the number 1
- Combine the relation index vectors of all objects found above using bitwise OR operations, in this case the relation index vector is 1111111 and no combinations are needed
- Add the combined relation index vector from the previous step to the result vector using bitwise AND or OR depending on how the criteria should be combined
  - The current result vector is 0000000
  - The combined relation index vector is 1111111
  - The criteria should be added using OR, since it is the first criteria
  - The result is 1111111

For the second filtering criteria find all objects that fulfill the criteria, in this case the object identified by the number 7
- Combine the relation index vectors of all objects found above using bitwise OR operations, in this case the relation index vector is 1000111 and no combinations are needed
- Add the combined relation index vector from the previous step to the result vector using bitwise AND or OR depending on how the criteria should be combined
  - The current result vector is 1111111
  - The combined relation index vector is 1000111
  - The criteria should be added using AND, since the first and second criteria are defined to be combined using AND
  - The result is 1000111

Since no further filtering criteria exist return all objects whose identity index vector is present in the result vector, in this case the objects identified by the numbers 1, 4, 6 and 7 as shown in the lower part of FIG. 4

In block 38 a result vector is created. The result vector starts with a zero value. The length of the result vector is the same as the length or the identity index vectors. An iteration process for each filtering criteria is then started in block 40. A first step in this iteration process is to find all objects that fulfill the criteria as shown in block 42. In block 44 all relation index vectors of found objects are combined into a combined relation index vector using logical OR operations. The combined relation index vector is added in block 46 to the created result vector using appropriate logical AND or OR operations depending on the query or filtering criteria. The iteration process is completed when all criteria have been added to the result vector as shown in block 48. Finally, in block 50 all objects with identity index vectors present in the result vector are returned.

The most differentiating part of the innovation is how the database engine, in an efficient manner, can utilize the index structures described above to answer questions containing reflective logic with an arbitrary reflection point. This type of questions can be described by the following characteristics using the terminology of reflective logic defined above:

1. Given one or more filtering criteria, i.e. restrictions in the dataset that correlates to one or more subsets of the dataset
2. Given how the filtering criteria should be combined
3. Given a type of objects that the query should be reflected in
4. Find the subset of objects that fulfill each filtering criteria
5. Find all objects that are either included in or related, directly or indirectly, to each subset from step 4
6. Combine the subsets from step 5 using logical set operations according to the information from step 2
7. Find all objects of the type of objects specified in step 3 that are present in the subset from step 6
8. For each object from step 7 find all objects that it is related to, either directly or indirectly
9. Combine all the objects from step 8, including the objects from step 7, into a new subset Questions of the type described above often needs to be asked against datasets in order to obtain a higher level of knowledge from the dataset. As an example, consider a dataset containing information from a clinical study that measured the blood pressure of the patients. A clinical researcher might be interested in finding an explanation of why certain patients had a high blood pressure. This question can be formulated, using the terminology defined previously for the reflective logic, as:Find all objects correlating to high blood pressure measurements
  2. Use the type of objects representing patients as the reflection point and reflect the objects from step 1 in this reflection point
  3. Analyze the information from step 2 with the objective of finding an explanation for the high blood pressure FIG. 10 (FIG. 11 $i$ underlag)

Figure 10:
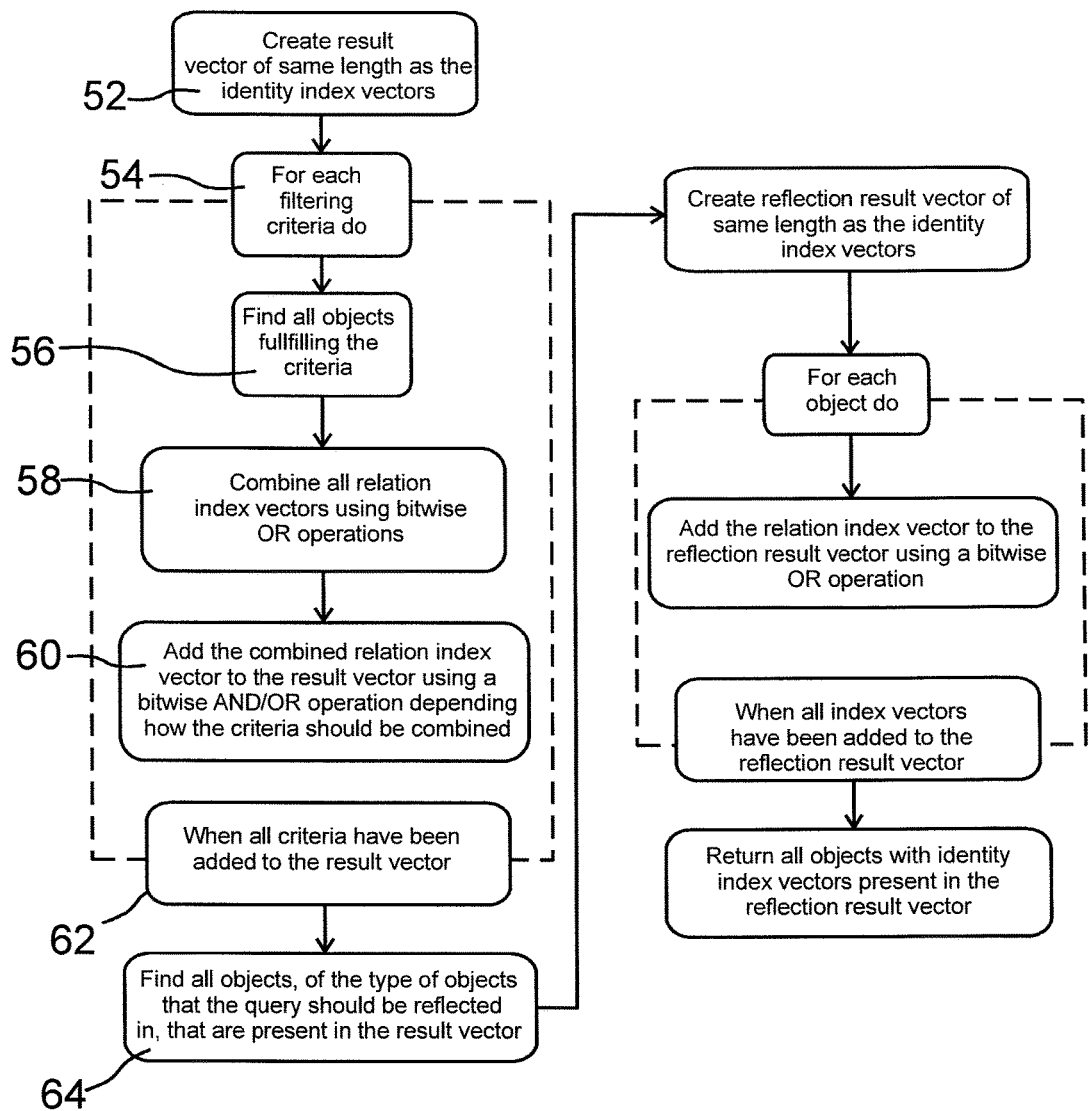
FIG. 10 is a diagram that shows how the database engine can use the index structures to answer a search query using reflective logic.
Figure 11:
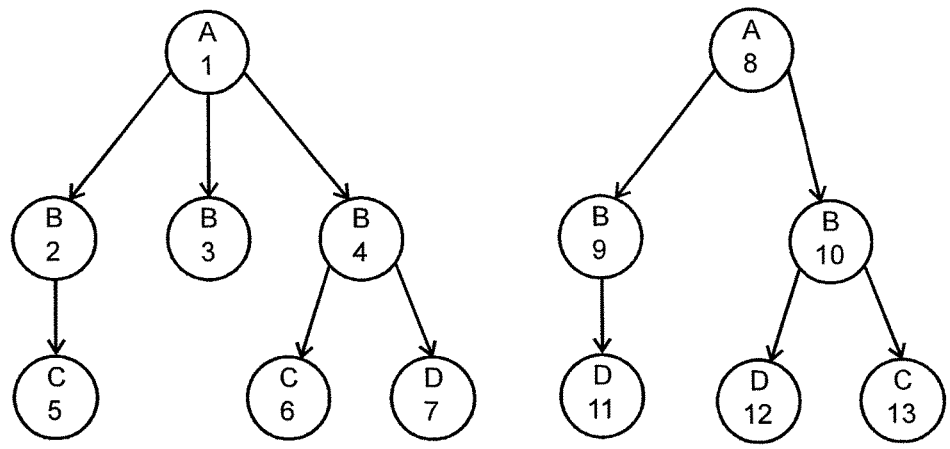
FIG. 11 is a diagram that shows an example of data with two root objects represented in the type of data model described.

FIG. 10 shows how the database engine utilizes the different index structures in order to answer a reflective logic query such as the one described above. An empty result vector first is created in block 52 and a further iteration process is started in block 54 for each filtering criteria. The result vector starts with a zero value. The length of the result vector is the same as the length or the identity index vectors. All objects fulfilling the criteria are determined in block 56. Then, in block 58 all relation index vectors are combined using logical OR operations to produce a combined relation index vector. In block 60 the combined relation index vector is added to the result vector depending on the combination of query or filtering criteria. The iteration process is completed when all criteria have been added to the result vector as shown in block 62.

Following this schematic for the example above and the dataset represented in FIG. 5 would yield the following steps:
  Create a result vector as a bit vector of same length as the identity index vectors
  For the first filtering criteria find all objects that fulfill the criteria, in this case the objects identified by the numbers 5 and 6
    Combine the relation index vectors of all objects found above using bitwise OR operations, in this case the relation index vectors are 1110000 and 1000110 and the combined result is
    Add the combined relation index vector from previous step to the result vector using bitwise AND or OR depending on how the criteria should be combined
    The current result vector is 0000000
    The combined relation index vector is 1110110
    The criteria should be added using OR, since it is the first criteria
    The result is 1110110
  Since no further filtering criteria exist continue to the next step
  Find all objects, of the type of objects that the query should be reflected in, that are present in the result vector
    The result vector is 1110110
    The object type identity index vector, of the type of objects that the query is reflected in, is 0101100
    The combination, using a bitwise AND operation, of the two bit vectors above is 0100100
    The bit vector above contains the unique identity of the objects identified by the numbers 2 and 4
  Create a reflection result vector as a bit vector of same length as the identity index vectors
  For the first object that was identified above add the relation index vector to the reflection result vector using a bitwise OR operation
    The first object identified is the object identified by the number 2
    The relation index vector of that object is 1110000
    The current reflection result vector is 0000000
    The result is 1110000
  For the second object that was identified above add the relation index vector to the reflection result vector using a bitwise OR operation
    The second object identified is the object identified by the number 4
    The relation index vector of that object is 1000111
    The current reflection result vector is 1110000
    The result is 1110111
  Since no further objects were identified above return all objects whose identity index vector is present in the reflection result vector, in this case the objects identified by the numbers 1, 2, 4, 5, 6 and 7

All the index structures described above are in the most basic form, but the invention also includes optimizations such as usage of compression and more complex encoding. Both the space and computational efficiency of the index structures can be increased by using a run-length encoding (RLE) based compression algorithm. A RLE based compression algorithm compresses consecutive runs of zeros or ones in an index vector. This works exceptionally well on the index vectors described by the innovation due to how they are created. All the identity index vectors have one bit set to one and all other bits set to zero. Since a RLE based compression algorithm compresses consecutive runs of zeroes the identity index vectors can be significantly compressed.

The relation index vectors have the bits corresponding to the identities of all the objects that the current object is related to set to one and all other bits set to zero. Since the identity index vectors are created by traversing the data model as a tree depth first it is highly probable that the bits corresponding to all the related objects will be one or more consecutive runs of ones. Since a RLE based compression algorithm compresses consecutive runs of zeroes and ones the relation index vectors can be significantly compressed.

The invention allows the data to be partitioned into different partitions that can be indexed and handled separately by using the same processes as when indexing all data using the method described above. This allows each partition to be updated, indexed and processed independently. Since each partition can be processed independently this also allows each partition to be processed in parallel.

The most basic partitioning is done using one partition for each object of the type of objects used for the root object of the data model. FIG. 11 gives a graphical example of how a dataset with multiple root objects can be represented. In this figure two different root objects, the objects identified by the numbers 1 and 8, are shown as different tree structures. If this data were to be partitioned using this schema two different partitions would be created. The first partition would contain the tree at the left hand side of the figure, with a root object identified by the number 1, and the second partition would contain the tree at the right hand side of the figure, with a root object identified by the number 8.

Figure 12:
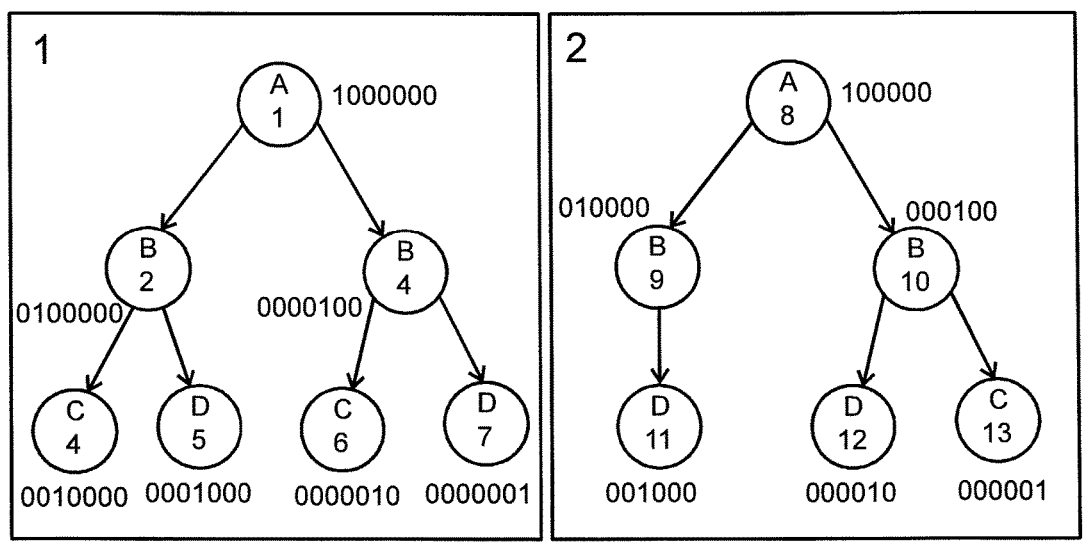
FIG. 12 is a diagram that shows an example of how the identity index, used by the database engine, may look for each object in a partitioned dataset.

In order to allow each partition to be indexed and processed independently the index vectors of different partitions are completely separated. FIG. 12 shows an example of an identity index for a small dataset with two different partitions, which are marked with a box in continuous line. Each partition is identified by a number in the upper left hand side of the box and the identity index vector is printed next to each object. For example, the object identified by the number 5 belongs to the partition identified by the number 1 and have an identity index vector or 0001000. The object identified by the number 11 belongs to the partition identified by the number 2 and have an identity index vector of 001000.

Figure 13:
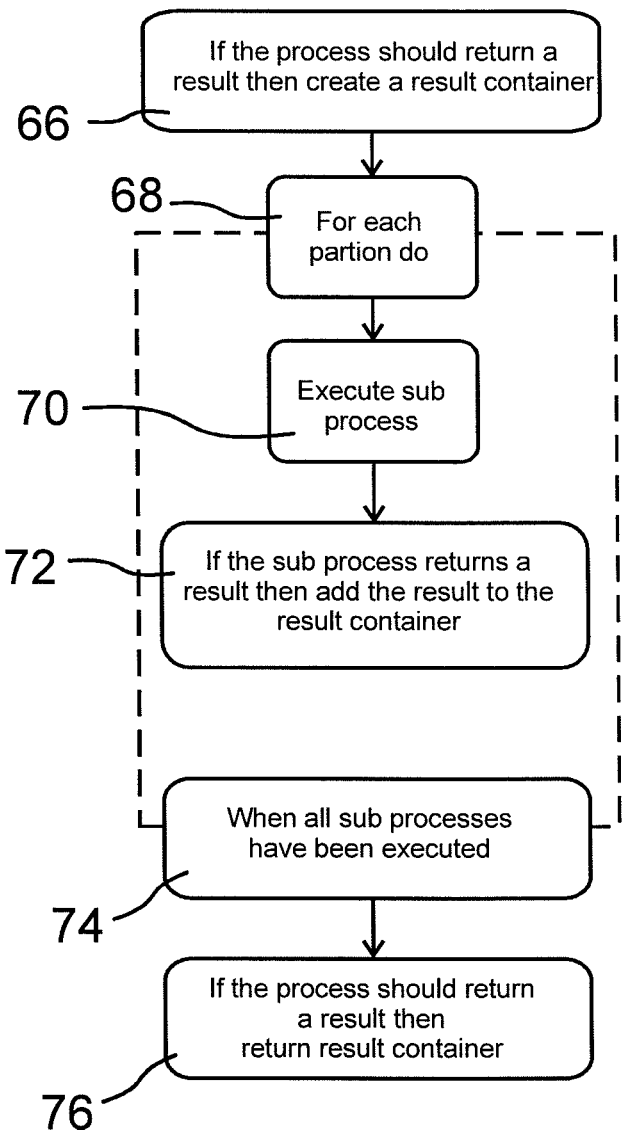
FIG. 13 is a diagram that shows how the database engine can extend previously defined processes when working with partitioned data.

FIG. 13 shows how the database engine utilizes the previously described processes when the data is partitioned into different partitions. This generic way of extending a process is used both for creating indexes and for answering queries. Following this schematic using the identity index creation process from FIG. 7 as the sub process and using the dataset represented in FIG. 12, see above, would yield the following steps:

Since the identity index creation process does not return a result no result container should be created
For the first partition, in this case the partition identified by the number 1, execute the identity index creation process
  Calculate the total number of objects in the partition, in this case 7 objects
  Create an object counter and set its value to 0
  Start with the first root object, in this case the object identified by the number 1
  Create an identity index vector for the first root object, in this case the object identified by the number 1
    The bit vector should be of length equal to the total number of objects, in this case 7
    Set all bits to zero except the bit of the same number as the object counter, in this case bit number 0
    The resulting bit vector is 1000000
  Increment the object counter by one, in this case the new value is 1
  Since the first root object contains children continue the process for each child
  Create an identity index vector for the first child, in this case the object identified by the number 2
    The bit vector should be of length equal to the total number of objects, in this case 7
    Set all bits to zero except the bit of the same number as the object counter, in this case bit number 1
    The resulting bit vector is 0100000
  Increment the object counter by one, in this case the new value is 2
  Since the current object contains children continue the process for each child
  Create an identity index vector for the first child, in this case the object identified by the number 4
    The bit vector should be of length equal to the total number of objects, in this case 7
    Set all bits to zero except the bit of the same number as the object counter, in this case bit number 2
    The resulting bit vector is 0010000
  Increment the object counter by one, in this case the new value is 3
  Since the current object does not contain any children continue the process for the parent, in this case the object identified by the number 2
  Create an identity index vector for the second child, in this case the object identified by the number 5
    The bit vector should be of length equal to the total number of objects, in this case 7
    Set all bits to zero except the bit of the same number as the object counter, in this case bit number 3
    The resulting bit vector is 0001000
  Increment the object counter by one, in this case the new value is 4
  Since the current object does not contain any children continue the process for the parent, in this case the object identified by the number 2
  Since the current object does not contain any more children continue the process for the parent, in this case the object identified by the number 1
  Create an identity index vector for the second child, in this case the object identified by the number 3
    The bit vector should be of length equal to the total number of objects, in this case 7
    Set all bits to zero except the bit of the same number as the object counter, in this case bit number 4
    The resulting bit vector is 0000100
  Increment the object counter by one, in this case the new value is 5
  Since the current object contains children continue the process for each child
  Create an identity index vector for the first child, in this case the object identified by the number 6
    The bit vector should be of length equal to the total number of objects, in this case 7
    Set all bits to zero except the bit of the same number as the object counter, in this case bit number 5
    The resulting bit vector is 0000010
  Increment the object counter by one, in this case the new value is 6
  Since the current object does not contain any children continue the process for the parent, in this case the object identified by the number 3
  Create an identity index vector for the second child, in this case the object identified by the number 7
    The bit vector should be of length equal to the total number of objects, in this case 7
    Set all bits to zero except the bit of the same number as the object counter, in this case bit number 6
    The resulting bit vector is 0000001
  Increment the object counter by one, in this case the new value is 7
  Since the current object does not contain any children continue the process for the parent, in this case the object identified by the number 3
  Since the current object does not contain any more children continue the process for the parent, in this case the object identified by the number 1
  Since the first root object does not contain any more children continue to the next root object
  Since no more root objects exist the sub process is complete Since the sub process does not return a result do not add anything to the result container For the second partition, in this case the partition identified by the number 2, execute the identity index creation process
  Calculate the total number of objects in the partition, in this case 6 objects
  Create an object counter and set its value to 0
  Start with the first root object, in this case the object identified by the number 8
  Create an identity index vector for the first root object, in this case the object identified by the number 8
    The bit vector should be of length equal to the total number of objects, in this case 6
    Set all bits to zero except the bit of the same number as the object counter, in this case bit number 0
    The resulting bit vector is 100000
  Increment the object counter by one, in this case the new value is 1
  Since the first root object contains children continue the process for each child
  Create an identity index vector for the first child, in this case the object identified by the number 9
    The bit vector should be of length equal to the total number of objects, in this case 6
    Set all bits to zero except the bit of the same number as the object counter, in this case bit number 1
    The resulting bit vector is 010000
  Increment the object counter by one, in this case the new value is 2
  Since the current object contains children continue the process for each child
  Create an identity index vector for the first child, in this case the object identified by the number 11
    The bit vector should be of length equal to the total number of objects, in this case 6
    Set all bits to zero except the bit of the same number as the object counter, in this case bit number 2
    The resulting bit vector is 001000
  Increment the object counter by one, in this case the new value is 3
  Since the current object does not contain any children continue the process for the parent, in this case the object identified by the number 9
  Since the current object does not contain any more children continue the process for the parent, in this case the object identified by the number 8
  Create an identity index vector for the second child, in this case the object identified by the number 10
    The bit vector should be of length equal to the total number of objects, in this case 6
    Set all bits to zero except the bit of the same number as the object counter, in this case bit number 3
    The resulting bit vector is 000100
  Increment the object counter by one, in this case the new value is 4
  Since the current object contains children continue the process for each child
  Create an identity index vector for the first child, in this case the object identified by the number 12
    The bit vector should be of length equal to the total number of objects, in this case 6
    Set all bits to zero except the bit of the same number as the object counter, in this case bit number 4
    The resulting bit vector is 000010
  Increment the object counter by one, in this case the new value is 5
  Since the current object does not contain any children continue the process for the parent, in this case the object identified by the number 10
  Create an identity index vector for the second child, in this case the object identified by the number 13
    The bit vector should be of length equal to the total number of objects, in this case 6
    Set all bits to zero except the bit of the same number as the object counter, in this case bit number 5
    The resulting bit vector is 000001
  Increment the object counter by one, in this case the new value is 6
  Since the current object does not contain any children continue the process for the parent, in this case the object identified by the number 10
  Since the current object does not contain any more children continue the process for the parent, in this case the object identified by the number 8
  Since the first root object does not contain any more children continue to the next root object
  Since no more root objects exist the sub process is complete
Since the sub process does not return a result do not add anything to the result container
Since no more partitions exist the process is complete The processes shown in FIG. 13 comprise the following steps: create a result container, block 66, for each partition do, block 68, execute sub process, block 70. If the sub process returns a result then add the result to the result container, block 72, end all when all sub processes have been executed, block 74, and finally return a result container, block 76.

The types of updates that can be done on a dataset can be divided into four different categories; addition of new objects, removal of existing objects, updates to information in existing objects and changes to the relations between objects. Since updates to information in existing objects do not modify the relations or the identity of the object no updates to the index structures are necessary. For the other categories of dataset updates the index structures must be modified in order to be valid for the modified dataset.

Figure 14:
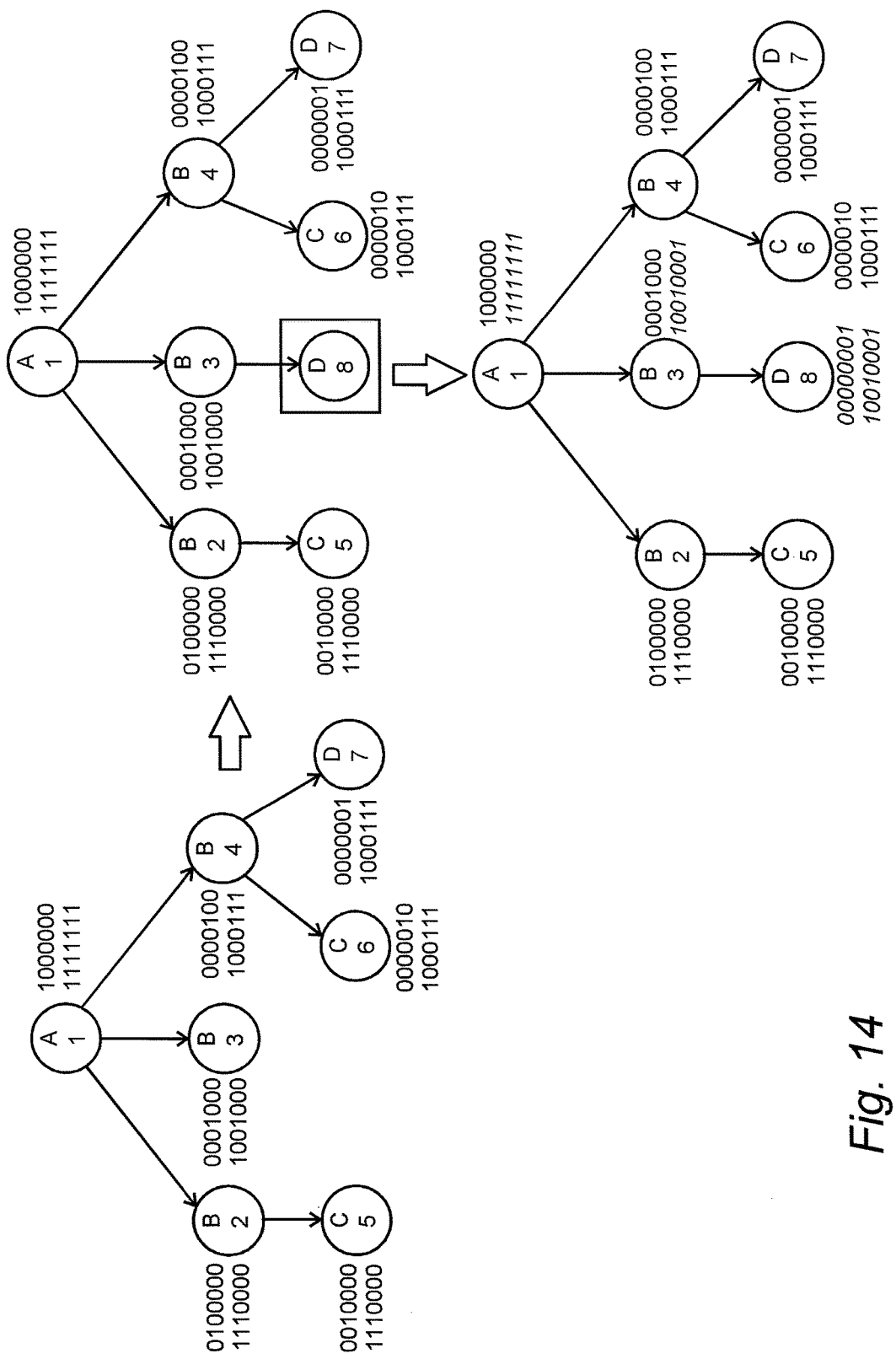
FIG. 14 is a diagram that shows an example of how the database engine may update the index structures when new data is added to a dataset.

FIG. 14 shows an example of how the database engine can update the index structures when a new object is added to the dataset. The information in the figure should be interpreted according to the following:
  The upper left hand side of the figure shows the original dataset
  The upper right hand side of the figure shows the dataset with the new object, which is marked with a continuous line
  The lower right hand side of the figure shows the dataset with updated index structures
  All index vectors that have been modified are italic, all other index vectors have not been modified In this example an object, identified by the number 8, is added to the dataset as a child of the object identified by the number 3. In order to keep the index structures valid the database engine must update the identity index, the relation index and the object type identity index. The database engine starts with creating a new identity index vector for the object identified by the number 8. In this case the new identity index vector will be 00000001. The next step, for the database engine, is to create a relation index vector for the new object. In this case the new relation index vector is 10010001. As the next step the relation index vectors of all objects, which are related to the new object, are updated. In this case the relation index vector of the object identified by the number 1 is updated to 11111111 and the relation index vector of the object identified by the number 3 is updated to 10010001. The last step is for the database engine to update the object type identity index. In this case the identity index vector of the new object is added to the object type identity index vector for the type of objects labeled D resulting in a new vector of 00000011.

As can be seen in FIG. 14 the length of the new and updated index vectors are one bit longer than the other index vectors. Due to the way bitwise operations work operations on bit vectors of different lengths will still work as intended. The reason for this is that the shorter bit vector will be implicitly padded with zeroes in order to reach the same length as the longer bit vector before the bitwise operation is done.

Figure 15:
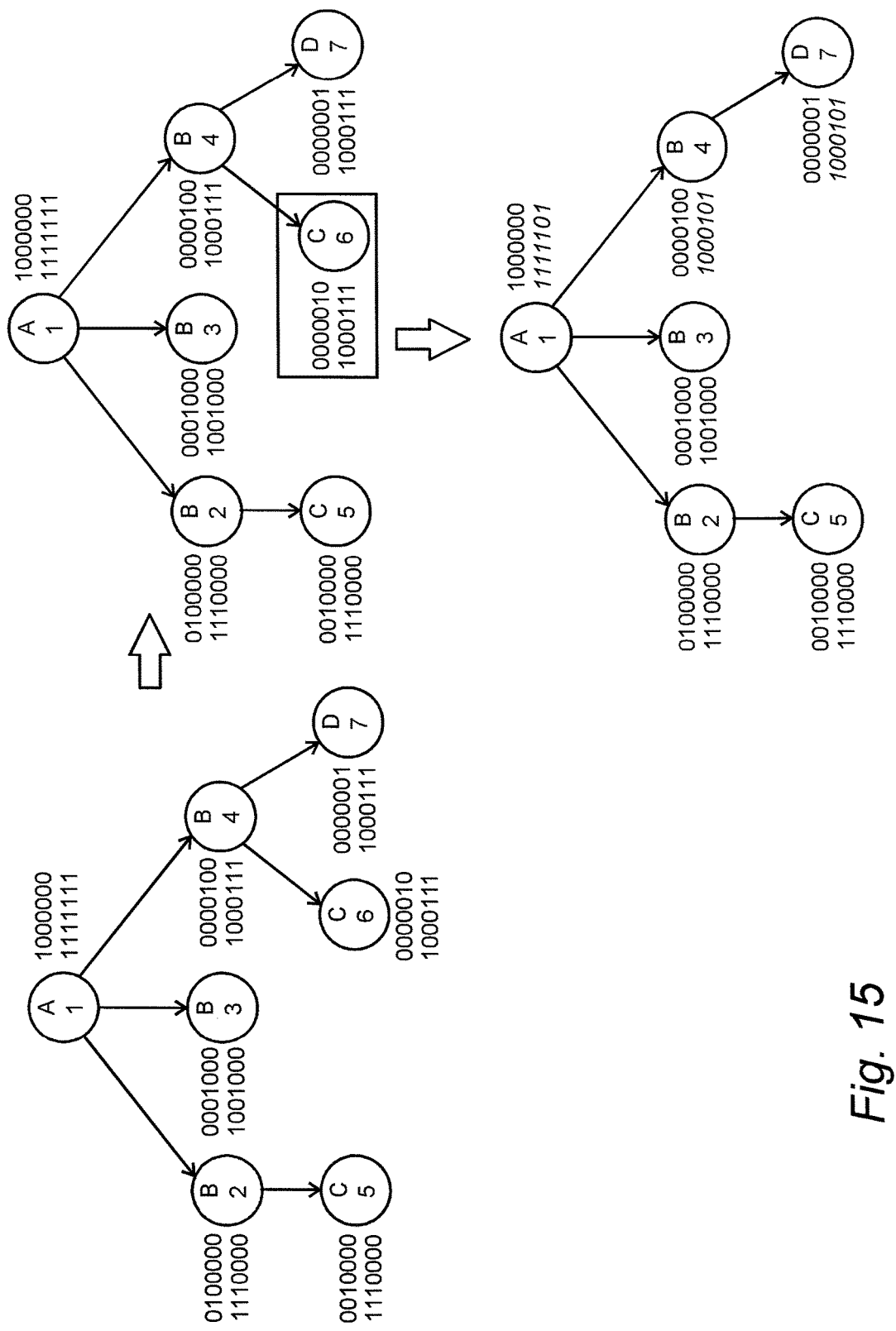
FIG. 15 is a diagram that shows an example of how the database engine may update the index structures when data is removed from a dataset.

FIG. 15 shows an example of how the database engine can update the index structures when an object is removed from the dataset. The information in the figure should be interpreted according to the following:
- The upper left hand side of the figure shows the original dataset
- The upper right hand side of the figure shows the dataset with the object that will be removed marked with a continuous line
- The lower right hand side of the figure shows the dataset with the object removed and the index structures updated
- All index vectors that have been modified are in italic, all other index vectors have not been modified In this example an object, identified by the number 6, is removed from the dataset. In order to keep the index structures valid the database engine must update the relation index, the object type identity index and the deleted identity bit vector. The database engine starts with removing the identity index vector, of the removed object, from the object type identity index vector. In this case the identity index vector, 0000010, is removed from the object type identity index vector for the type of objects labeled D resulting in a new vector of 0010000. The next step, for the database engine, is to update the relation index vectors of all objects that are related to the removed object. In this case the relation index vector of the object identified by the number 1 is updated to 1111101, the relation index vector of the object identified by the number 4 is updated to 1000101 and the relation index vector of the object identified by the number 7 is updated to 1000101.

Figure 16:
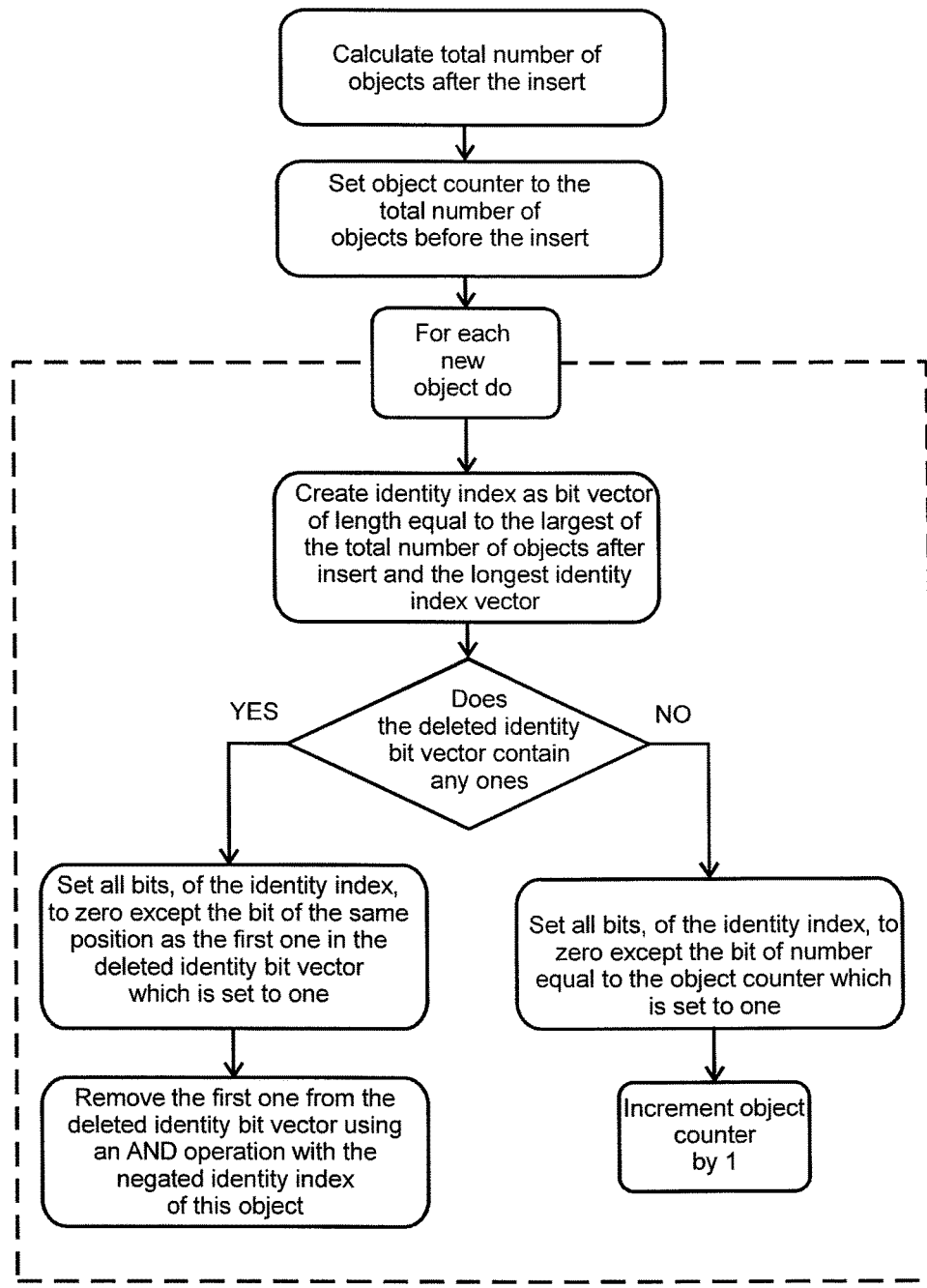
FIG. 16 is a diagram that shows how the identity index is created for new objects when data is added to a dataset.
Figure 17:
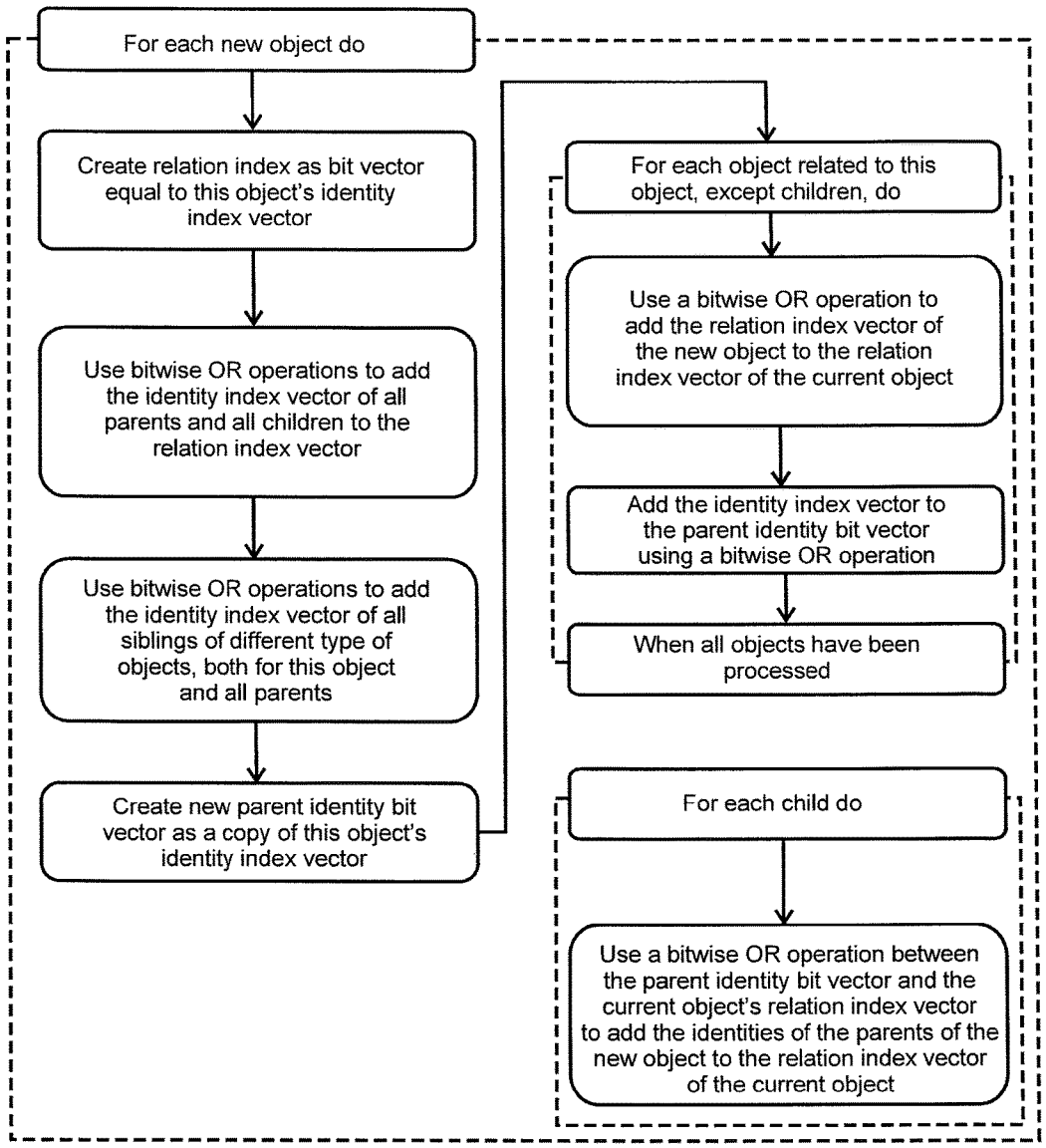
FIG. 17 is a diagram that shows how the relation index is updated when new data is added to a dataset.
Figure 18:
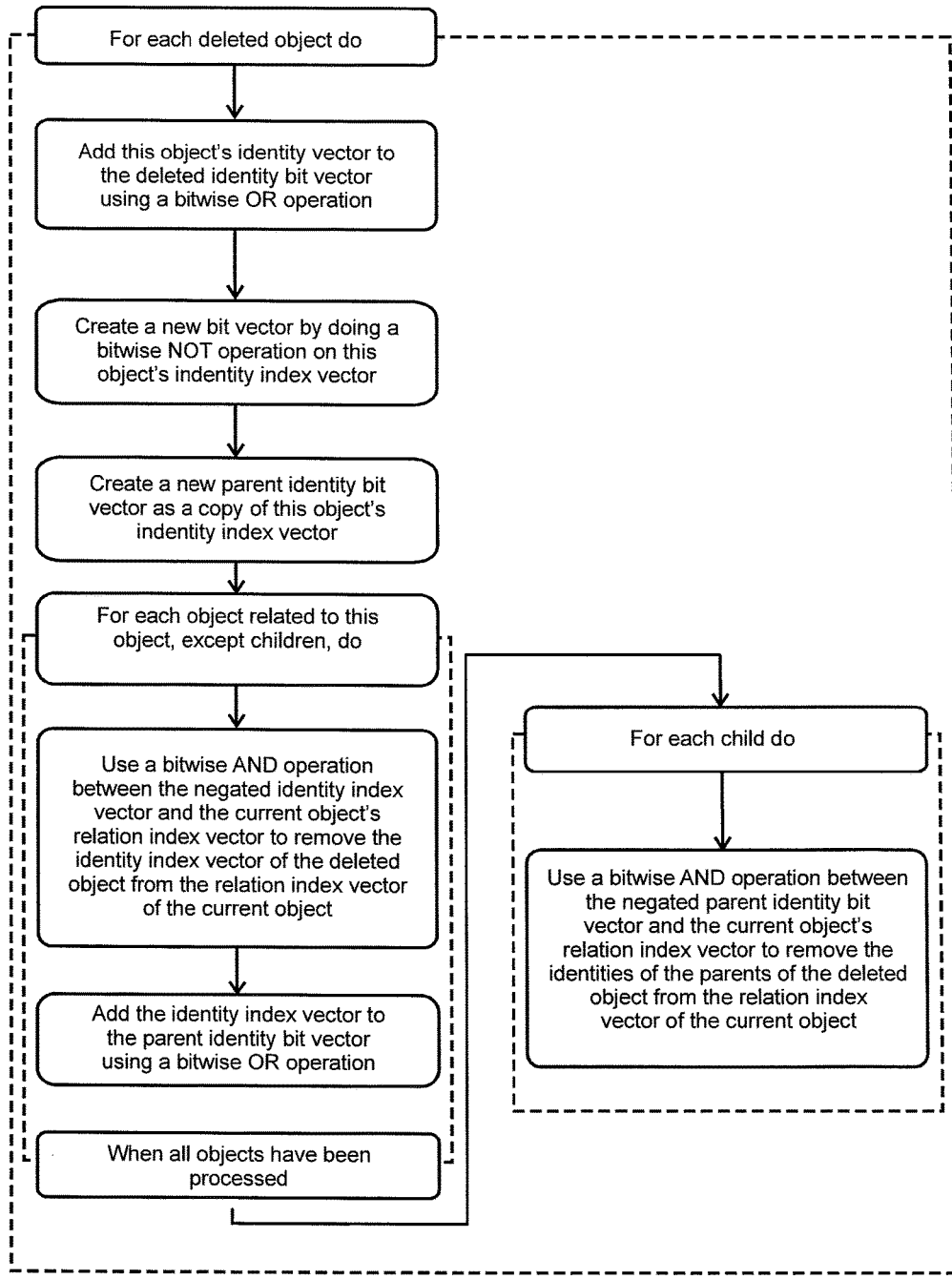
FIG. 18 is a diagram that shows how the relation index is updated when data is removed from a dataset.

FIG. 16 shows a schematic representation of how the database engine creates identity index vectors for objects added to the dataset. Following this schematic using the dataset represented in FIG. 14 would yield the following steps that will create the same identity index vector as shown in FIG. 14:
- Calculate the total number of objects, after the new objects have been added, in the dataset, in this case 8 objects
- Create an object counter and set its value to the total number of objects in the dataset before the new objects where added, in this case 7
- Start with the first object that was added, in this case the object identified by the number 8
  - Create an identity index vector of length equal to the largest of the total number of objects in the data set and the longest identity index vector, in this case 8
  - Since no objects have been deleted in this data set the deleted identity bit vector does not contain any ones and a new identity index vector should be created by using the object counter
  - Set all bits to zero except the bit of the same number as the object counter, in this case bit number 7
  - The resulting bit vector is 00000001
  - Increment the object counter by one, in this case the new value is 8
- Since no more objects have been added the process is complete FIG. 17 shows a schematic representation of how the database engine creates relation index vectors for objects added to the dataset and updates relation index vectors for objects related to the new objects. Following this schematic using the dataset represented in FIG. 14 would yield the following steps:
- Start with the first object that was added, in this case the object identified by the number 8
  - Create a relation index vector equal to the objects identity index vector, in this case 00000001
  - Use bitwise OR operations to add the identity index vectors for all parents and all children, in this case 0001000 and 1000000
  - Use bitwise OR operations to add the identity of all siblings of different type of objects and all siblings of different kind of objects for all parents, in this case none
  - The resulting bit vector is 10010001
  - Create a parent identity bit vector equal to the objects identity index vector, in this case 00000001
  - Update the relation index vectors for all objects related to this object, except children
    - Start with the parent of the new object, in this case the object identified by the number 3
      - Use a bitwise OR operation to add the relation index vector of the new object to the current object, in this case use a bitwise OR operation to add 10010001 to 1001000 resulting in 10010001
      - Add the identity index vector of the current object to the parent identity bit vector
        - The current value of the parent identity bit vector is 00000001
        - The identity index vector of the current object is 0001000
        - The result is 00010001
    - Continue with the next parent, in this case the object identified by the number 1
      - Use a bitwise OR operation to add the relation index vector of the new object to the current object, in this case use a bitwise OR operation to add 10010001 to 1111111 resulting in 11111111
      - Add the identity index vector of the current object to the parent identity bit vector
        - The current value of the parent identity bit vector is 00010001
        - The identity index vector of the current object is 1000000
        - The result is 10010001
    - Since no more parents exist this part of the process is complete
  - Update the relation index vectors for all children of this object
  - Since no children exist this part of the process is complete
- Since no more objects have been added the process is complete FIG. 18 shows a schematic representation of how the database engine updates the relation index vectors for objects related to objects that were removed from the dataset. Following this schematic using the dataset represented in FIG. 15 would yield the following steps and create the same relation index vectors as shown in FIG. 15:

Start with the first object that was removed, in this case the object identified by the number 6
  Add this objects identity vector to the deleted identity bit vector
  Create a new bit vector by doing a bitwise NOT operation on the object's identity index vector
    The identity index vector is 0000010
    The result is 1111101
  Create a parent identity bit vector equal to the object's identity index vector, in this case 0000010
  Update the relation index vectors for all objects related to this object, except children
    Start with the parent of the deleted object, in this case the object identified by the number 4
      Use a bitwise AND operation, between the deleted object's negated identity index vector and the current object's relation index vector to remove the identity index vector of the deleted object, in this case use a bitwise AND operation to remove 0000010 from 1000111 resulting in 1000101
      Add the identity index vector of the current object to the parent identity bit vector
        The current value of the parent identity bit vector is 0000010
        The identity index vector of the current object is 0000100
        The result is 0000110
    Continue with the first sibling of the deleted object, in this case the object identified by the number 7
      Use a bitwise AND operation, between the deleted object's negated identity index vector and the current object's relation index vector to remove the identity index vector of the deleted object, in this case use a bitwise AND operation to remove 0000010 from 1000111 resulting in 1000101
      Add the identity index vector of the current object to the parent identity bit vector
        The current value of the parent identity bit vector is 0000110
        The identity index vector of the current object is 0000001
        The result is 0000111
    Continue with the next parent, in this case the object identified by the number 1
      Use a bitwise AND operation, between the deleted object's negated identity index vector and the current object's relation index vector to remove the identity index vector of the deleted object, in this case use a bitwise AND operation to remove 0000010 from 1111111 resulting in 1111101
      Add the identity index vector of the current object to the parent identity bit vector
        The current value of the parent identity bit vector is 0000111
        The identity index vector of the current object is 1000000
        The result is 1000111
    Since no more parents exist this part of the process is complete
  Update the relation index vectors for all children of this object
    Since no children exist this part of the process is complete
Since no more objects have been removed the process is complete The deleted identity bit vector mentioned above and used in the schematics represented by FIG. 16, FIG. 17 and FIG. 18 is used to be able to reuse bits, in the different index structures, previously used by deleted objects. This allows the database engine to never use index vectors of a length longer than the maximum amount of objects that has been present in the dataset.

The last category of dataset updates, where the database engine must be able to update the index structures, is changes to the relations between objects. If a relation is changed for an object, e.g. the target of a relation is changed or a relation is removed, then the index structures are updated as if the object was first deleted and then added with the new relation information. In this way the database engine can keep all index structures valid even after a relation is changed.

Since updating the index structures in the way described above will make the indexes structures fragmented over time there is a need to rebuild the index structures after enough updates have been performed. That the index structures are fragmented means, in this context, that they might contain unused bits where a deleted object used to be or that the order of the objects in the bit vectors are no longer optimal and thus a lower compression rate and processing speed might be achieved.

While certain illustrative embodiments of the invention have been described in particularity, it will be understood that various other modifications will be readily apparent to those skilled in the art without departing from the scope and spirit of the invention. Accordingly, it is not intended that the scope of the claims appended hereto be limited to the description set forth herein but rather that the claims be construed as encompassing all equivalents of the present invention which are apparent to those skilled in the art to which the invention pertains.

The invention claimed is:

1. A method of indexing a dataset in a database for storing and retrieving data from the database, the method comprising:
  providing a database engine for creating, within the database, a logical data model of objects representing data in the data set and contained by the object, each object belonging to a type of object representing informational concepts, wherein the objects may or may not be related to other objects by:
    assigning a respective identity index bit vector (IIBV) to each respective object in a dataset of a database, each IIBV having a bit length at least as long as the total number of objects in the dataset, each respective IIBV having one bit position set to one and all other bit positions set to zero, the bit position set to one being unique amongst all IIBVs in the dataset, wherein each object in the dataset includes zero or more attributes, wherein each IIBV is assigned without association to how the data set is stored in the database;
    generating, for each respective object in the dataset, a respective relation index bit vector (RIBV) by combining, using bitwise OR operations, the IIBVs of all objects that the respective object is related to, each respective RIBV having a bit length equal to the bit length of the IIBV of the respective object; and
    generating, for each respective object type in the dataset, a type index bit vector (TIBV) by combining, using bitwise OR operations, the IIBVs of each object of the respective object type, wherein the dataset includes a plurality of object types;

wherein the logical data model is database schema independent because the IIBV of each object is not associated with how the dataset is stored in the database so that a user may query the database without knowing how the dataset is structured in the database; and wherein an update to an attribute of an object does not require any change to the IIBV, RIBV, or TIBV of any object within the logical data model.

2. A method as claimed in claim 1, further comprising:
aligning each IIBV to a word length of a targeted processor architecture by setting the number of bits in each IIBV to the lowest multiple of the word length that can represent all objects and by setting any extra bits to zero.

3. The method of claim 2, further comprising:
separating a dataset into a plurality of partitions, and for a partition:
  assigning a respective identity index bit vector (IIBV) to each respective object in the partition, each IIBV having a bit length at least as long as the total number of objects in the partition, each respective IIBV having one bit position set to one and all other bit positions set to zero, the bit position set to one being unique amongst all IIBVs in the partition;
  generating, for each respective object in the partition, a respective relation index bit vector (RIBV) by combining, using bitwise OR operations, the IIBVs of all objects in the partition that the respective object is related to, each respective RIBV having a bit length equal to the bit length of the IIBV of the respective object; and
  generating, for each respective object type in the partition, a type index bit vector (TIBV) by combining, using bitwise OR operations, the IIBVs of each object of the respective object type in the partition.

4. The method of claim 1, wherein each object in the dataset is related to at least one other object in the dataset.

5. The method of claim 1, wherein the dataset comprises a plurality of object types.

6. The method of claim 1, wherein each respective object type in the dataset comprises at least one object.

7. The method of claim 1, further comprising:
identifying objects to retrieve from the dataset by:
  identifying a first subset of objects comprising selected objects satisfying filtering criteria specified in a reflective logic query;
  identifying all objects in the dataset that are related to the first subset of objects by combining, using bitwise OR operations, the RIBVs of the selected objects to form a combined relation index bit vector (CRIBV);
  identifying a second subset of objects containing all objects of a specified object type that the query is reflected in by performing a bitwise AND between the CRIBV and the TIBV of the specified object type; and
  combining, using bitwise OR operations, the RIBVs of all objects in the second subset of objects to form a result set bit vector (RSBV), wherein each bit position of the RSBV that has a value of one uniquely identifies an IIBV of an object to retrieve.

8. The method of claim 1, further comprising:
separating a dataset into a plurality of partitions, and for a partition:
  assigning a respective identity index bit vector (IIBV) to each respective object in the partition, each IIBV having a bit length at least as long as the total number of objects in the partition, each respective IIBV having one bit position set to one and all other bit positions set to zero, the bit position set to one being unique amongst all IIBVs in the partition;
  generating, for each respective object in the partition, a respective relation index bit vector (RIBV) by combining, using bitwise OR operations, the IIBVs of all objects in the partition that the respective object is related to, each respective RIBV having a bit length equal to the bit length of the IIBV of the respective object; and
  generating, for each respective object type in the partition, a type index bit vector (TIBV) by combining, using bitwise OR operations, the IIBVs of each object of the respective object type in the partition.

* * * * *